United States Patent
Jung et al.

(10) Patent No.: US 11,907,568 B2
(45) Date of Patent: Feb. 20, 2024

(54) STORAGE CONTROLLER, STORAGE DEVICE, AND OPERATION METHOD OF STORAGE DEVICE

(71) Applicant: SAMSUNG ELECTRONICS CO., LTD., Suwon-si (KR)

(72) Inventors: Kibeen Jung, Incheon (KR); Seungjun Yang, Hwaseong-si (KR); Byeonghui Kim, Hwaseong-si (KR); Jungmin Seo, Seongnam-si (KR); Jaewoong Kim, Suwon-si (KR); Hyeongyu Min, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 17/501,225

(22) Filed: Oct. 14, 2021

(65) Prior Publication Data
US 2022/0113899 A1    Apr. 14, 2022

(30) Foreign Application Priority Data

Oct. 14, 2020    (KR) .................. 10-2020-0132838

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
See application file for complete search history.

(56) References Cited

U.S. PATENT DOCUMENTS

| | | | |
|---|---|---|---|
| 9,898,200 B2 | 2/2018 | Yang et al. | |
| 10,338,842 B2 | 7/2019 | Martineau et al. | |
| 2014/0067368 A1* | 3/2014 | Yih | ...... G06F 16/3338 704/9 |
| 2016/0065534 A1* | 3/2016 | Liu | ...... G06F 16/287 707/728 |
| 2017/0228188 A1 | 8/2017 | Hassani et al. | |

(Continued)

FOREIGN PATENT DOCUMENTS

| | | |
|---|---|---|
| EP | 3651024 | 5/2020 |
| KR | 10-1544309 | 8/2015 |
| KR | 1020180026327 | 3/2018 |

*Primary Examiner* — Prasith Thammavong
(74) *Attorney, Agent, or Firm* — F. Chau & Associates, LLC

(57) ABSTRACT

An operation method of a storage device includes receiving a first write request; adding the first write request to a first fragment; selecting at least "n" (e.g., at least two) streams among a plurality of pre-allocated streams when a size of the first fragment, when a size of the first fragment is >=a reference value, based on a cosine similarity between the first fragment and each of the pre-allocated streams; applying input information to a machine learning model to detect a first sequential stream associated with the first fragment from among the at least "n" streams; allocating a stream identifier of the first sequential stream to the first fragment; and storing write data included in the first fragment based on the stream identifier of the first sequential stream. The input information includes statistical information of at least one of the "n" streams and the first fragment.

20 Claims, 16 Drawing Sheets

(56) References Cited

U.S. PATENT DOCUMENTS

| | | | |
|---|---|---|---|
| 2017/0371585 A1* | 12/2017 | Lazo | G06F 3/061 |
| 2018/0285214 A1 | 10/2018 | Ashraf et al. | |
| 2018/0307596 A1 | 10/2018 | Pandurangan et al. | |
| 2019/0146927 A1* | 5/2019 | Frolikov | G06F 12/1009 711/103 |
| 2019/0155684 A1 | 5/2019 | Akutsu et al. | |
| 2019/0286373 A1* | 9/2019 | Karumbunathan | G06F 3/065 |
| 2019/0303038 A1* | 10/2019 | Hubbard | G06F 3/0685 |
| 2020/0012444 A1 | 1/2020 | Ko et al. | |
| 2021/0201154 A1* | 7/2021 | Rozental | G06F 16/9032 |

* cited by examiner

FIG. 6

SAT
[Stream Attribute Table]

| SID | Starting LBA | End LBA | Starting Time | End Time | Throughput | Size Vector |
|---|---|---|---|---|---|---|
| SID_1 | sLBA_1 | eLBA_1 | sT_1 | eT_1 | TP_1 | SV_1 |
| SID_2 | sLBA_2 | eLBA_2 | sT_2 | eT_2 | TP_2 | SV_2 |
| ... | ... | ... | ... | ... | ... | ... |
| SID_n | sLBA_n | eLBA_n | sT_n | eT_n | TP_n | SV_n |

STORAGE CONTROLLER, STORAGE DEVICE, AND OPERATION METHOD OF STORAGE DEVICE

CROSS-REFERENCE TO RELATED APPLICATIONS

This non-provisional patent application claims priority under 35 U.S.C. § 119 to Korean Patent Application No. 10-2020-0132838 filed on Oct. 14, 2020, in the Korean Intellectual Property Office, the disclosure of which is incorporated by reference in its entirety herein.

1. TECHNICAL FIELD

Embodiments of the present disclosure described herein relate to a semiconductor memory, and more particularly, relate to a storage controller configured to support a multi-stream, a storage device, and an operation method thereof.

2. DISCUSSION OF RELATED ART

Semiconductor memory is a digital electronic semiconductor device used for digital data storage. Semiconductor memory may include a volatile memory or nonvolatile memory. In volatile memory, stored data is lost when a power is turned off. Examples of volatile memory include static random access memory (SRAM) and dynamic random access memory (DRAM). In nonvolatile memory, stored data is retained even when a power is turned off. Examples of nonvolatile memory include flash memory, a phase-change RAM (PRAM), a magnetic RAM (MRAM), a resistive RAM (RRAM), and a ferroelectric RAM (FRAM).

A solid state drive (SSD) including flash memory is widely used as a high-capacity storage medium of a computing system. The SSD may generate different types of data for the host depending on the application. However, operations of the SSD to generate the data are not optimized for the different types of data and a lifespan of the SSD may be reduced when data of some of these types are generated.

SUMMARY

At least one embodiments of the present disclosure provides a storage controller with increased performance and increased lifetime by classifying data from a host into units of a stream, a storage device, and an operation method of the storage device.

According to an exemplary embodiment of the disclosure, an operation method of a storage device including a nonvolatile memory device includes: receiving a first write request from an external host; adding the first write request to a first fragment; selecting at least "n" streams (e.g., at least two) among a plurality of pre-allocated streams when a size of the first fragment is greater than or equal to a reference value, based on a cosine similarity between the first fragment and each of the pre-allocated streams; applying input information to a machine learning model to detect a first sequential stream associated with the first fragment from among the at least "n" streams; allocating a stream identifier of the first sequential stream to the first fragment; and storing, in the nonvolatile memory device, write data included in the first fragment based on the allocated stream identifier of the first sequential stream. The input information includes statistical information of at least one of the "n" streams and the first fragment.

According to an exemplary embodiment of the disclosure, a storage controller configured to control a nonvolatile memory device is provided. The storage controller includes a host interface circuit that receives a first write request from an external host, a stream manager that adds the first write request to a first fragment, a flash translation layer, a processor, and a memory interface circuit. When the first fragment is greater than or equal to a reference value, the stream manager applies statistical information of the first fragment and at least one of the pre-allocated streams to a machine learning model to allocate a first sequential stream to the first fragment. The flash translation layer translates a logical block address of the first write request into a physical block address based on the first sequential stream. The processor drives the flash translation layer. The memory interface circuit provides the nonvolatile memory device with the physical block address, write data of the first write request, and a write command.

According to an embodiment of the disclosure, a storage device includes a plurality of nonvolatile memories, and a storage controller that communicates with the plurality of nonvolatile memories through a plurality of channels. The storage controller is configured to receive a plurality of write requests from an external host, perform machine learning on statistical information of the plurality of received write requests thus received and statistical information of at least one of a plurality of pre-allocated streams, allocates a first sequential stream to the plurality of received write requests based on a result of the machine learning, and stores a plurality of write data corresponding to the plurality of write requests in one of the plurality of nonvolatile memories, based on the allocated first sequential stream.

According to an embodiment of the disclosure, a storage device includes a storage controller and a nonvolatile memory device. The nonvolatile memory device includes a plurality of first regions and a plurality of second regions, where each of the first regions is associated with one of a plurality of stream identifiers. The storage controller is configured to determine whether an address of a write request is associated with a given stream identifier among the stream identifiers. When the storage controller determines the address is associated with the given stream identifier, the storage controller programs write data of the write request to one of the first regions associated with the given stream identifier. When the storage controller determines the address is not associated with any of the stream identifiers, the storage controller creates a new stream identifier, associates a given region among the second regions with the new stream identifier, and programs the write data to the given region.

BRIEF DESCRIPTION OF THE FIGURES

The present disclosure will become apparent by describing in detail exemplary embodiments thereof with reference to the accompanying drawings.

FIG. 6 is a diagram illustrating a stream attribute table of FIG. 5.

DETAILED DESCRIPTION OF THE EXEMPLARY EMBODIMENTS

Below, embodiments of the present disclosure are described in detail and clearly to such an extent that one of ordinary skill in the art may implement the present disclosure.

Components described in the specification by using the terms "part", "unit", "module", "engine", "manager", etc. and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
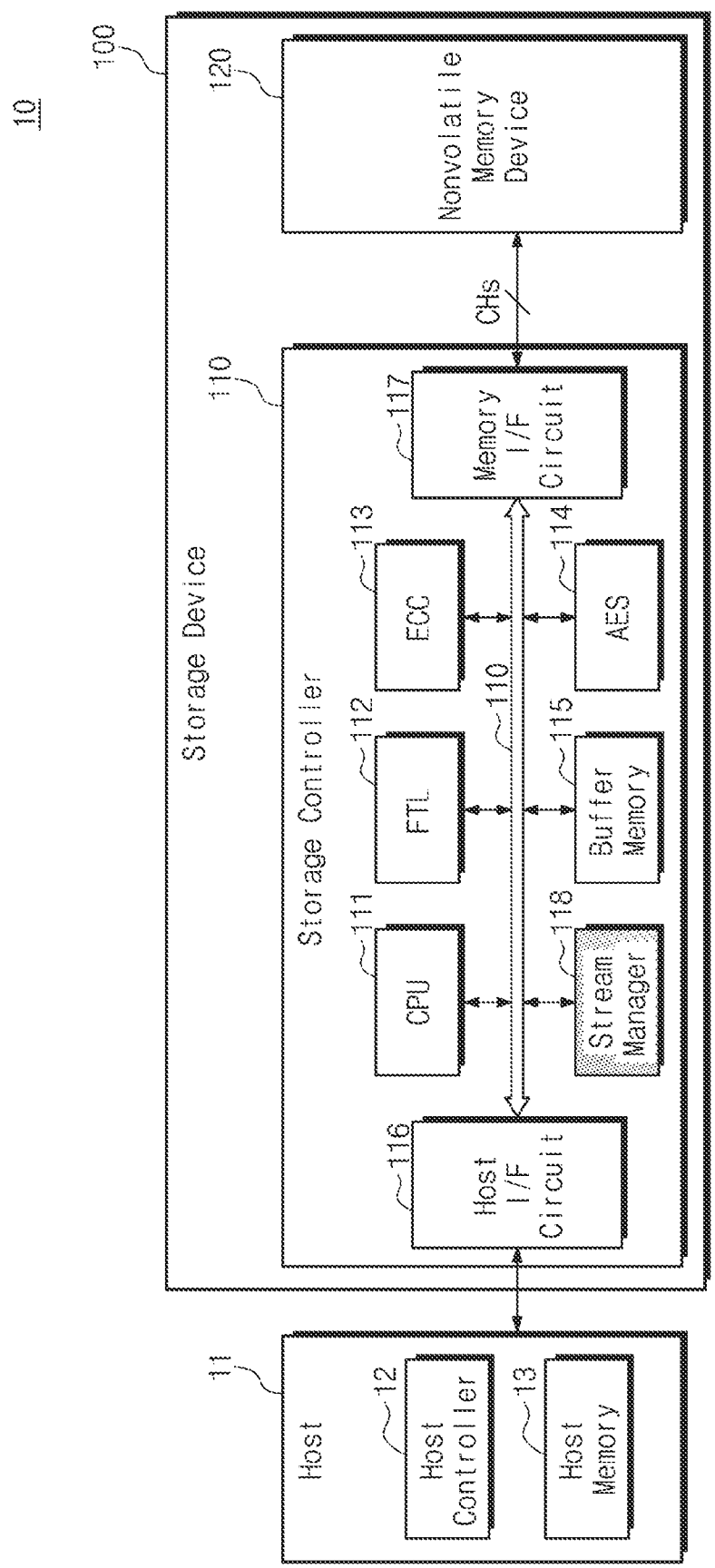
FIG. 1 is a block diagram illustrating a storage system according to an exemplary embodiment of the present disclosure.

FIG. 1 is a block diagram illustrating a storage system according to an exemplary embodiment of the present disclosure. Referring to FIG. 1, a storage system 10 include a host 11 (e.g., a host device) and a storage device 100. In an embodiment, the storage system 10 may be one of a plurality of information processing devices, which are configured to process a variety of information and to store the processed information, such as a personal computer (PC), a laptop, a server, a workstation, a smartphone, a tablet PC, a digital camera, or a black box.

The host 11 may control overall operations of the storage device 100. For example, the host 11 may transmit, to the storage device 100, a request (RQ) for storing data "DATA" in the storage device 100 or reading the data "DATA" stored in the storage device 100. In an embodiment, the host 11 may be a central processing unit (CPU) configured to control the storage system 10 or a processor core such as an application processor (AP) or may be a computing node connected through a network.

In an embodiment, the host 11 includes a host controller 12 (e.g., a control circuit) and a host memory 13. The host controller 12 may be a device that is configured to control overall operations of the host 11 or to control the storage device 100 on the host 11. The host memory 13 may be a buffer memory, a cache memory, or a working memory that is used in the host 11.

The storage device 100 may operate under control of the host 11. In an embodiment, the storage device 100 includes a storage controller 110 (e.g., a control circuit) and a nonvolatile memory device 120. Under control of the host 11, the storage controller 110 may store data in the nonvolatile memory device 120 or may read data stored in the nonvolatile memory device 120. In an embodiment, the storage controller 110 may perform various management operations for using the nonvolatile memory device 120 efficiently.

In an embodiment, the storage controller 110 includes a central processing unit (CPU) 111, a flash translation layer (FTL) 112, an error correction code (ECC) engine 113, an advanced encryption standard (AES) engine 114, a buffer memory 115, a host interface circuit 116, a memory interface circuit 117, a stream manager 118, and a bus 119.

The CPU 111 may perform overall operations of the storage controller 110. The FTL 112 may perform various operations for using the nonvolatile memory device 120 efficiently. For example, the host 11 may manage a storage space of the storage device 100 by using logical addresses. The FTL 112 may be configured to manage address mapping between a logical address from the host 11 and a physical address of the storage device 100. For example, the storage controller 110 may convert a logical address from the host 11 into a physical address of the storage device 100 using the FTL 112. The FTL 112 may perform a wear-leveling operation to prevent excessive degradation of a specific memory block of memory blocks of the nonvolatile memory device 120. The lifetime or lifespan of the nonvolatile memory device 120 may be improved by the wear-leveling operation of the FTL 112. The FTL 112 may perform a garbage collection operation on the nonvolatile memory device 120 to secure a free memory block(s). For example, the garbage collection operation may copy valid data from a group of memory blocks to a single memory block and perform an erase operation on the group of memory blocks.

In an embodiment, the FTL 112 may be implemented in the form of hardware or software. In the case where the FTL 112 is implemented in the form of software, a program code or information associated with the FTL 112 may be stored in the buffer memory 115 and may be executed by the CPU 111. In the case where the FTL 112 is implemented in the form of hardware, a hardware accelerator configured to perform the operation of the FTL 112 may be provided independently of the CPU 111.

The ECC engine 113 may perform error detection and error correction on data read from the nonvolatile memory device 120. For example, the ECC engine 113 may generate an error correction code (or a parity bit) for data to be written in the nonvolatile memory device 120. The error correction code (or parity bit) thus generated may be stored in the nonvolatile memory device 120 together with the data to be written. Afterwards, when data written in the nonvolatile memory device 120 is read, the ECC engine 113 may detect and correct an error of the read data based on the read data and the corresponding error correction code (or the corresponding parity bit).

The AES engine 114 may perform an encryption operation or a decryption operation on data received from the host 11 or the nonvolatile memory device 120. In an embodiment, the encryption operation or the decryption operation may be performed based on a symmetric-key algorithm.

The buffer memory 115 may be a write buffer or a read buffer configured to temporarily store data input to the storage controller 110. Alternatively, the buffer memory 115 may be configured to store a variety of information necessary for the storage controller 110 to operate. For example, the buffer memory 115 may store a mapping table that is managed by the FTL 112. Alternatively, the buffer memory 115 may store software, firmware, or information associated with the FTL 112.

In an embodiment, the buffer memory 115 is an SRAM, but the present disclosure is not limited thereto. For example, the buffer memory 115 may be implemented with various types of memory devices such as a DRAM, an MRAM, and a PRAM. For brevity of drawing and convenience of description, an embodiment is illustrated in FIG. 1 of the buffer memory 115 being included in the storage controller 110, but the present disclosure is not limited thereto. The buffer memory 115 may be located outside the storage controller 110, and the storage controller 110 may communicate with the buffer memory 115 through a separate communication channel or interface.

The host interface circuit 116 may be configured to communicate with the host 11 in compliance with a given interface protocol. In an embodiment, the given interface protocol may include at least one of protocols for the following interfaces: an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, and a network interface. The host interface circuit 116 may receive a signal from the host 11 in compliance with the given interface protocol and may operate based on the received signal. Alternatively, the host interface circuit 116 may transmit a signal to the host 11 in compliance with the given interface protocol.

The memory interface circuit 117 may be configured to communicate with the nonvolatile memory device 120 in compliance with a given interface protocol. In an embodiment, the given interface protocol may include at least one of protocols for the following interfaces: a toggle interface and an Open NAND Flash Interface (ONFI). In an embodiment, the memory interface circuit 117 may communicate with the nonvolatile memory device 120 based on the toggle interface. In this case, the memory interface circuit 117 may communicate with the nonvolatile memory device 120 through a plurality of channels CHs. In an embodiment, each of the plurality of channels CHs may include a plurality of signal lines configured to transmit various control signals (e.g., /CE, CLE, ALE, /WE, /RE, and R/B), data signals DQ, and a data strobe signal DQS.

The stream manager 118 may manage data received from the host 11 in units of a stream or may classify the received data into a plurality of streams. For example, data received from the host 11 may have various attributes. In the case where data is stored in the nonvolatile memory device 120 without separate data classification, a maintenance operation (e.g., a garbage collection operation) for the nonvolatile memory device 120 may be frequently performed. As the maintenance operation is frequently performed, the overall performance of the storage device 100 may be reduced.

The stream manager 118 of the storage controller 110 according to an exemplary embodiment of the present disclosure classifies data received from the host 11 into units of a stream based on various attributes (e.g., a logical block address, a data size, and a data frequency) of the received data and stores the data in the nonvolatile memory device 120 based on the classified stream. In this case, because data having similar features are classified as being part of the same stream, the number of times a maintenance operation is performed for the nonvolatile memory device 120 may decrease. Accordingly, a reduction of overall performance of the storage device 100 may be prevented. In an exemplary embodiment, the stream manager 118 performs stream allocation on data from the host 11 based on machine learning. A stream allocating method of the present disclosure will be more fully described with reference to the following drawings.

As described above, according to an exemplary embodiment of the present disclosure, even though there is no feature information (e.g., explicit stream designation) of data provided from the host 11, the storage device 100 performs a classification on data to classify the data into a plurality of streams based on information about various attributes of data and manages the data based on a classification result of the classification. In this case, because a decrease in the number of times a maintenance operation is performed for the nonvolatile memory device 120 is achieved, such as a garbage collection operation, the storage device 100 having increased performance and increased lifetime is provided.

Figure 2:
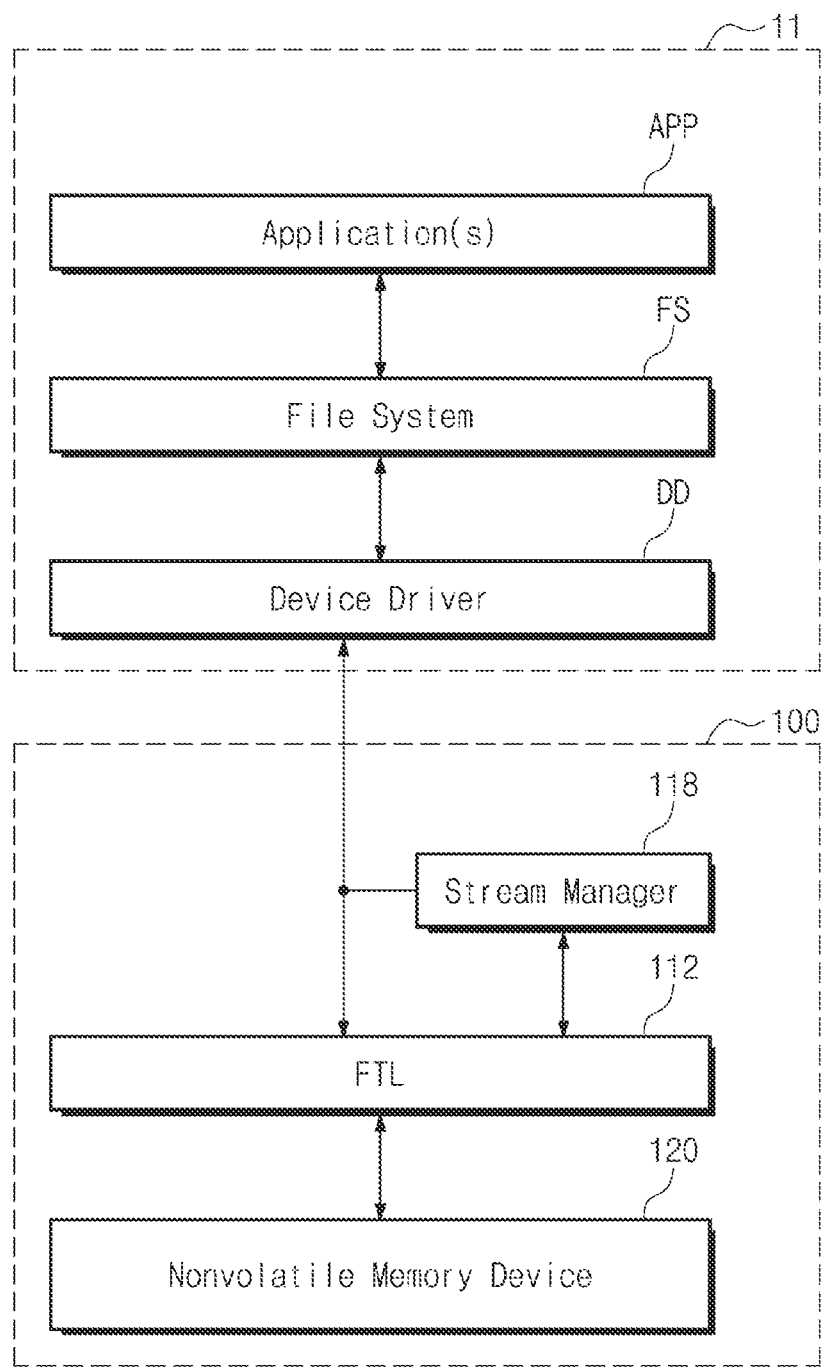
FIG. 2 is a diagram illustrating software layers of a storage system of FIG. 1.

FIG. 2 is a diagram illustrating software layers of a storage system of FIG. 1. Referring to FIGS. 1 and 2, software layers of the storage system 10 may include an application layer APP, a file system layer FS, a device driver layer DD, the stream manager 118, and a flash translation layer 112.

The application layer APP may include various application programs that are driven by the host 11. The file system layer FS may be configured to organize files or data that are used by the application layer APP. For example, the file system layer FS may be configured to manage a storage space of the storage device 100 by using a logical block address (LBA). The file system layer FS may be configured to allocate and manage a logical block address to data to be stored in the storage device 100. In an embodiment, a file system of the file system layer FS may be variable depending on an operating system of the host 11. For example, the file system layer FS may include at least one of various file systems such as a File Allocation Table (FAT), FAT32, an NT File System (NTFS), a Hierarchical File System (HFS), a Journaled File System2 (JSF2), XFS, an On-Disk Structure-5 (ODS-5), UDF, ZFS, Unix File System (UFS), ext2, ext3, ext4, ReiserFS, Reiser4, ISO 9660, Gnome VFS, BFS, and WinFS. The device driver DD may perform an operation of translating information from the file system layer FS or the application layer APP into information that is recognizable by the storage device 100. In an embodiment, the application layer APP, the file system layer FS, and the device driver DD may be implemented in the form of software and may be driven on the host 11.

The stream manager 118 may be configured to allocate a stream in response to a request received from the host 11. In an embodiment, the stream manager 118 is configured to allocate a stream based on machine learning.

The FTL 112 may be configured to translate a logical block address of a request received from the host 11 into a physical block address (or a physical address) to be used in the nonvolatile memory device 120. In an embodiment, the FTL 112 receives information about an allocated stream identifier from the stream manager 118 and performs address mapping such that data stored in the nonvolatile memory device 120 is allocated for each stream in response to the request received from the host 11.

Figure 3:
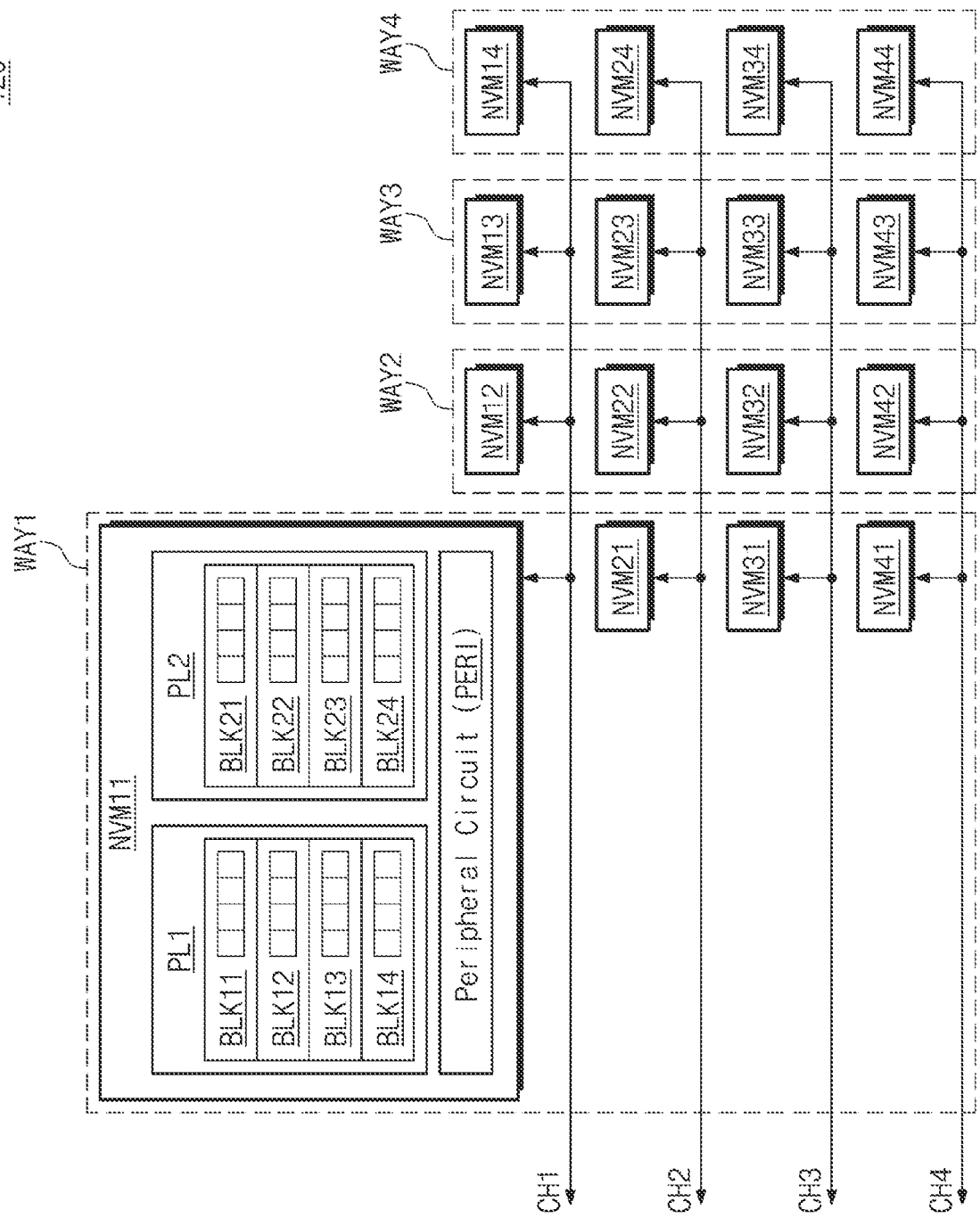
FIG. 3 is a block diagram illustrating a nonvolatile memory device of FIG. 1.
Figure 4:
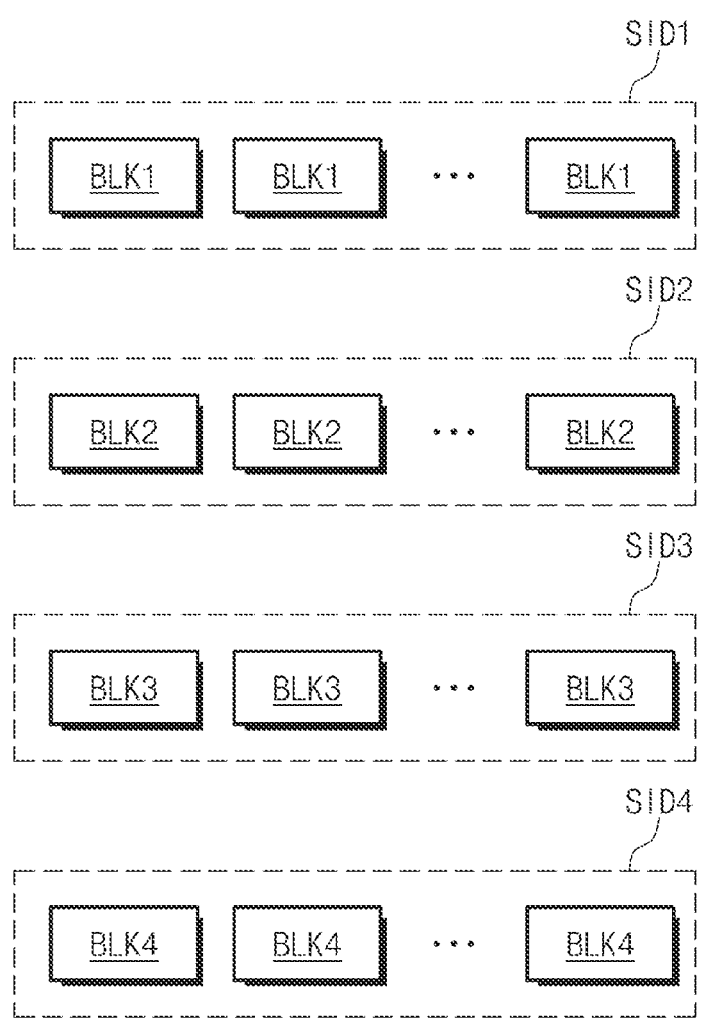
FIG. 4 is a diagram for describing a stream managed at a storage device.

FIG. 3 is a block diagram illustrating a nonvolatile memory device of FIG. 1. FIG. 4 is a diagram for describing a stream managed at a storage device. Referring to FIGS. 1, 3, and 4, the nonvolatile memory device 120 may include a plurality of nonvolatile memories NVM11 to NVM44. Each of the plurality of nonvolatile memories NVM11 to NVM44 may be implemented with one semiconductor chip, one semiconductor die, or one semiconductor package.

The nonvolatile memory NVM11 may include a plurality of planes PL1 and PL2 and a peripheral circuit PERI. The plane PL1 may include a plurality of memory blocks BLK11 to BLK14, and the plane PL2 may include a plurality of memory blocks BLK21 to BLK24. Each of the plurality of memory blocks BLK11 to BLK14 and BLK21 to BLK24 may include a plurality of pages. In an embodiment, a plurality of memory blocks (e.g., BLK11 to BLK14) included in the same plane (e.g., PL1) may be configured to share the same bit lines, but the present disclosure is not limited thereto.

The peripheral circuit PERI of the nonvolatile memory NVM11 may be connected with a relevant channel (e.g., CH1) among a plurality of channels CH1 to CH4. In response to various signals received through the relevant channel, the peripheral circuit PERI may store data received through the relevant channel in the plurality of planes PL1 and PL2 or may output data read from the plurality of planes PL1 and PL2 through the relevant channel. For the above operation, the peripheral circuit PERI may include various components such as an address decoder, a voltage generator, a page buffer circuit, an input/output circuit, and a control logic circuit.

For brevity of drawing, an embodiment is illustrated as one nonvolatile memory NVM11 including two planes PL1 and PL2 and each of the planes PL1 and PL2 including four memory blocks, but the present disclosure is not limited thereto. For example, the number of planes, the number of memory blocks, or the number of pages may be variously changed or modified. In an embodiment, the remaining nonvolatile memories NVM12 to NVM44 are similar in structure to the nonvolatile memory NVM11 described above, and thus, additional description will be omitted to avoid redundancy.

The nonvolatile memories NVM11, NVM12, NVM13, and NVM14 belonging to a first part from among the plurality of nonvolatile memories NVM11 to NVM44 may communicate with the storage controller 110 through the first channel CH1, the nonvolatile memories NVM21, NVM22, NVM23, and NVM24 belonging to a second part from among the plurality of nonvolatile memories NVM11 to NVM44 may communicate with the storage controller 110 through the second channel CH2, the nonvolatile memories NVM31, NVM32, NVM33, and NVM34 belonging to a third part from among the plurality of nonvolatile memories NVM11 to NVM44 may communicate with the storage controller 110 through the third channel CH3, and the nonvolatile memories NVM41, NVM42, NVM43, and NVM44 belonging to a fourth part from among the plurality of nonvolatile memories NVM11 to NVM44 may communicate with the storage controller 110 through the fourth channel CH4. The nonvolatile memories NVM11, NVM21, NVM31, and NVM41 belonging to the first part may constitute a first way WAY1, the nonvolatile memories NVM12, NVM22, NVM32, and NVM42 belonging to the second part may constitute a second way WAY2, the nonvolatile memories NVM13, NVM23, NVM33, and NVM3 belonging to the third part may constitute a third way WAY3, and the nonvolatile memories NVM14, NVM24, NVM34, and NVM44 belonging to the fourth part may constitute a fourth way WAY4. That is, the nonvolatile memory device 120 may have a multi-way/multi-channel structure, and it may be understood that embodiments of the present disclosure are not limited to the structure illustrated in FIG. 3.

In an embodiment, the storage device 100 may manage a plurality of memory blocks included in the nonvolatile memory device 120 based on a plurality of streams. For example, as illustrated in FIG. 4, the storage device 100 may manage first memory blocks BLK1 of a plurality of memory blocks as a first stream corresponding to a first stream identifier SID1, may manage second memory blocks BLK2 thereof as a second stream corresponding to a second stream identifier SID2, may manage third memory blocks BLK3 thereof as a third stream corresponding to a third stream identifier SID3, and may manage fourth memory blocks BLK4 thereof as a fourth stream corresponding to a fourth stream identifier SID4.

In an embodiment, memory blocks (e.g., the first memory blocks BLK1) corresponding to the same stream identifier (e.g., SID1) may be included in the same plane, may be included in the same nonvolatile memory, may be included in nonvolatile memories connected with the same channel, or may be included in nonvolatile memories included in the same way. Alternatively, memory blocks (e.g., the first memory blocks BLK1) corresponding to a stream identifier (e.g., SID1) may be distributed across a plurality of nonvolatile memories. However, the above descriptions are exemplary, and the present disclosure is not limited thereto.

As described above, in an embodiment, the stream manager 118 manage data having features similar to features of a same stream, and thus, the data of similar features may be stored in memory blocks corresponding to the same stream. In this case, because data stored at the same stream have similar features, the performance of the storage device 100 may be prevented from being reduced due to a maintenance operation (e.g., a garbage collection operation), or a write amplification factor (WAF) may decrease.

Figure 5:
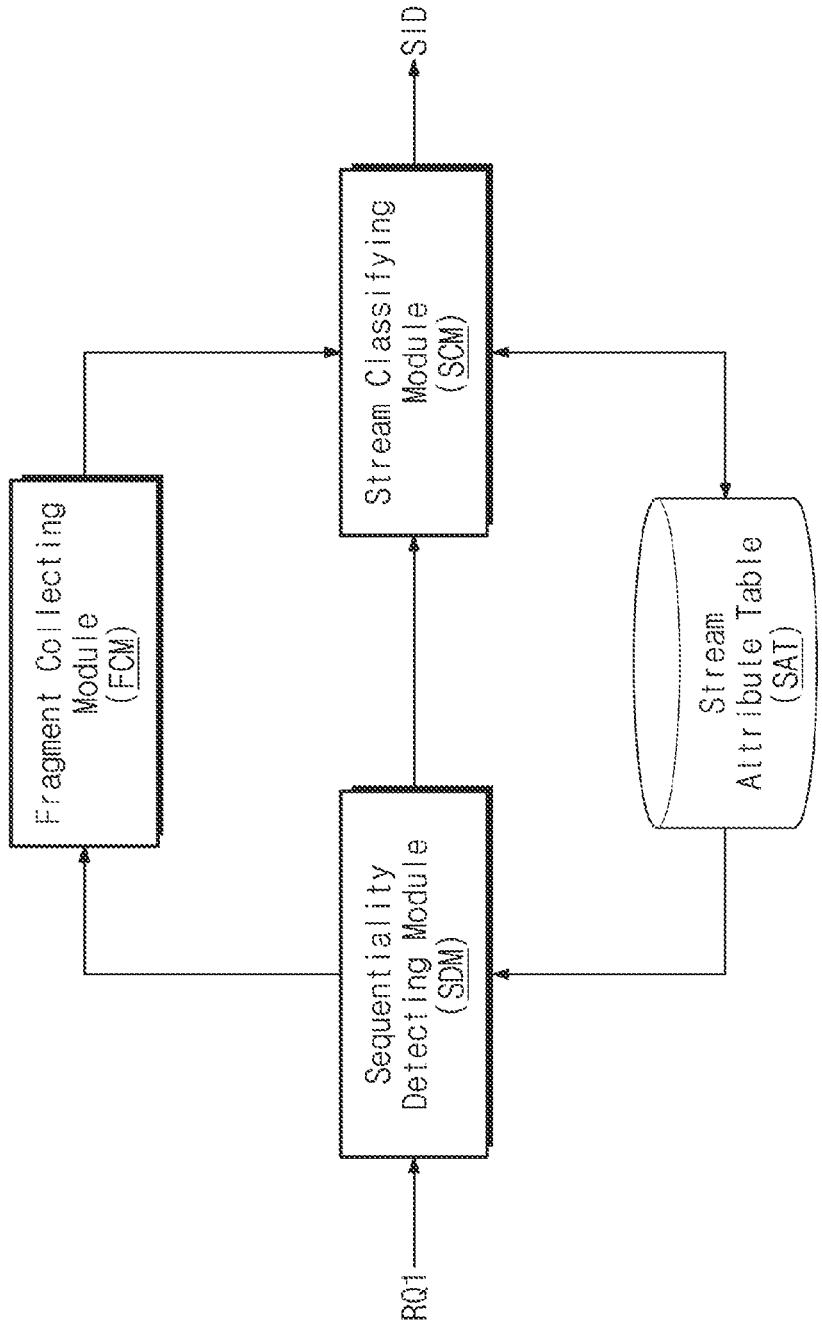
FIG. 5 is a diagram illustrating a stream manager of FIG. 1.

FIG. 5 is a diagram illustrating a stream manager of FIG. 1. FIG. 6 is a diagram illustrating a stream attribute table of FIG. 5. For ease of understanding, embodiments of the disclosure are described below where the storage device 100 receives a first write request RQ1 from the host 11 and allocates a stream in response to the first write request RQ1. In an embodiment, the first write request RQ1 provided from the host 11 does not include information about a stream identifier. However, the present disclosure is not limited thereto.

In an embodiment, a method of allocating a stream to the first write request RQ1 will be mainly described with reference to the following drawings, but the present disclosure is not limited thereto. For example, the storage device 100 may perform the following operation (i.e., an address mapping operation and a program operation) based on the method described with reference to FIGS. 1 to 4, such that write data corresponding to a write request are stored in the nonvolatile memory device 120 for each allocated stream.

Below, the terms "stream", "stream identifier", "fragment", etc. are used to describe the present disclosure. The stream may mean a set of data having the same feature or similar features. Alternatively, the stream may mean a set of data, of which logical block addresses managed by the host 11 are sequential. The stream identifier may be allocated to each of a plurality of streams as unique information for distinguishing the plurality of streams. The fragment may indicate a data unit by which one stream is divided. For example, a stream may be divided into a plurality of fragments. In an embodiment, even though a specific data group (i.e., a group of data having the same feature or similar features) is managed by the host 11 by using continuous or sequential logical block addresses, the specific data group may be fragmented by an operation of a kernel layer or a file system layer of the host 11. In this case, write requests continuously or sequentially received from the host 11 may have logical block addresses that are discontinuous or non-sequential. That is, at least two write requests which are received at discontinuous or non-sequential times and of which logical block addresses are continuous or sequential may be included in one fragment. In an embodiment, one fragment includes at least one request, and one stream includes at least one fragment. However, the present disclosure is not limited thereto.

Below, the term "sequential stream" is used to describe the present disclosure. The sequential stream may indicate a stream sequential to a specific write request or a stream having a feature similar to that of a specific fragment. That is, a sequential stream associated with a write request may indicate a stream sequential to the write request from among pre-allocated streams. A sequential stream associated with a specific fragment may indicate a stream having attributes the same as or similar to attributes of the specific fragment.

Referring to FIGS. 1, 5, and 6, the stream manager 118 may include a stream attribute table SAT, a sequentiality detecting module SDM, a fragment collecting module FCM, and a stream classifying module SCM. In an embodiment, the stream manager 118 may be implemented in the form of software, hardware, or a combination thereof. For example, components of the stream manager 118 may be implemented in the form of software. In this case, the software components may be stored in the buffer memory 115 (refer to FIG. 1) and may be executed or managed by the CPU 111. Alternatively, components of the stream manager 118 may be implemented in the form of hardware. In this case, a hardware accelerator for implementing an operation of the stream manager 118 may be further included in the storage controller 110. Alternatively, components of the stream manager 118 may be implemented in the form of a combination of software and hardware. In this case, software components may be stored in the buffer memory 115 or a separate storage circuit and may be executed by dedicated hardware in which hardware components are implemented. However, the present disclosure is not limited thereto. For example, the stream manager 118 may be variously changed or modified without departing from the technical idea of the present disclosure.

The stream attribute table SAT may be configured to include statistical information about each of the pre-allocated streams. The statistical information may include the following information about each of the pre-allocated streams: a stream identifier SID, a starting logical block address sLBA, an end logical block address eLBA, a starting time sT, an end time eT, a throughput TH, and a size vector SV.

The stream identifier SID may be unique information allocated to each of a plurality of pre-allocated streams. For example, as illustrated in FIG. 6, a plurality of stream identifiers SID_1 to SID_n may be respectively allocated to the plurality of pre-allocated streams. The plurality of pre-allocated streams may be distinguishable from one another through the plurality of stream identifiers SID_1 to SID_n.

Below, for convenience of description, the terms "stream identifier" and "stream" and reference signs are interchangeably used. That is, "SID_1" may be a reference sign indicating a first stream identifier and may directly indicate a first stream corresponding to the first stream identifier.

The starting logical block address sLBA may indicate the smallest logical block address of logical block addresses of write requests (or write data) included in each of the plurality of pre-allocated streams. For example, as illustrated in FIG. 6, the smallest logical block address of logical block addresses of write requests or write data included in the first stream SID_1 may be a first starting logical block address sLBA_1. The smallest logical block address of logical block addresses of write requests or write data included in the second stream SID_2 may be a second starting logical block address sLBA_2. Likewise, the smallest logical block address of logical block addresses of write requests or write data included in the n-th stream SID_n may be an n-th starting logical block address sLBA_n.

The end logical block address eLBA may indicate the greatest logical block address of logical block addresses of write requests (or write data) included in each of the plurality of pre-allocated streams. For example, as illustrated in FIG. 6, the greatest logical block address of the logical block addresses of the write requests or write data included in the first stream SID_1 may be a first end logical block address eLBA_1. The greatest logical block address of the logical block addresses of the write requests or write data included in the second stream SID_2 may be a second end logical block address eLBA_2. Likewise, the greatest logical block address of the logical block addresses of the write requests or write data included in the n-th stream SID_n may be an n-th end logical block address sLBA_n.

In an embodiment, a logical block address range of each of a plurality of write streams may be calculated based on a starting logical block address and an end logical block address of each of the plurality of pre-allocated streams. For example, a logical block address range of the first stream SID_1 may range from the first starting logical block address sLBA_1 to the first end logical block address eLBA_1.

The starting time sT may indicate a time at which each of the plurality of pre-allocated streams is generated. For example, as illustrated in FIG. 6, the first stream SID_1 may be generated at a first starting time sT_1, the second stream SID_2 may be generated at a second starting time sT_2, and the third stream SID_3 may be generated at a third starting time sT_3. In an embodiment, that a specific stream is generated may mean that a write request or write data are allocated to the specific stream for the first time.

The end time eT may indicate a final time at which a write request or write data are added to each of the plurality of pre-allocated streams. For example, as illustrated in FIG. 6, a final time at which a write request or write data are added to the first stream SID_1 may be a first end time eT_1, a final time at which a write request or write data are added to the second stream SID_2 may be a second end time eT_1, and a final time at which a write request or write data are added to the n-th stream SID_n may be an n-th end time eT_n.

The throughput TH may indicate a size of write data per unit time, which are added to each of the plurality of pre-allocated streams. For example, as illustrated in FIG. 6, a size of write data per unit time, which are added to the first stream SID_1, may be a first throughput TH_1, a size of write data per unit time, which are added to the second stream SID_2, may be a second throughput TH_2, and a size of write data per unit time, which are added to the n-th stream SID_n, may be an n-th throughput TH_n.

The size vector SV may indicate a size distribution of write requests or write data corresponding to each of the plurality of pre-allocated streams. For example, as illustrated in FIG. 6, a size distribution of the write requests or write data included in the first stream SID_1 may be a first size vector SV_1, a size distribution of the write requests or write data included in the second stream SID_2 may be a second size vector SV_2, and a size distribution of the write requests or write data included in the n-th stream SID_n may be an n-th size vector SV_n. In an embodiment, as understood from Equation 1 below, the size vector SV may be expressed in a vector form of a size and a frequency of requested data.

$$\vec{v} = \{(r_1:c_1),(r_2:c_2),(r_3:c_3),\ldots,(r_k:c_k)\} \quad \text{[Equation 1]}$$

Referring to Equation 1, "v" indicates the size vector SV, "r" indicates a size of requested data, and "c" indicates a frequency for the size of the requested data.

As described above, the stream attribute table SAT may include the following statistical information about each pre-allocated stream: a starting logical block address, an end logical block address, a starting time, an end time, a throughput, and a size vector. In an embodiment, the stream attribute table SAT may be stored in the buffer memory 115 of the storage controller 110 or in a separate storage circuit.

The sequentiality detecting module SDM may be configured to detect a sequential stream corresponding to the first write request RQ1 received from the host 11, based on the stream attribute table SAT. For example, the sequentiality detecting module SDM may determine whether the first write request RQ1 is sequential to any stream of the pre-allocated streams, based on the stream attribute table SAT.

In an exemplary embodiment, the sequentiality detecting module SDM determines whether a logical block address of the first write request RQ1 is included in a logical block address range of the pre-allocated streams. In the case where the logical block address of the first write request RQ1 is included in a logical block address range of a specific stream of the pre-allocated streams, the sequentiality detecting module SDM determines that the first write request RQ1 is sequential to the specific stream. In this case, the specific stream may be a sequential stream associated with the first write request RQ1.

In an embodiment where the sequential stream associated with the first write request RQ1 is detected by the sequentiality detecting module SDM, information about the first write request RQ1 is provided to the stream classifying module SCM, and the stream classifying module SCM allocates the detected sequential stream to the first write request RQ1 using the information (i.e., may allocate a corresponding stream identifier to the sequential stream).

In an embodiment where the logical block address of the first write request RQ1 is not included in the logical block address range of the pre-allocated streams, the sequentiality detecting module SDM determines that the first write request RQ1 is not sequential to the pre-allocated streams. In this case, a sequential stream associated with the first write request RQ1 may be absent from the pre-allocated streams.

When it is determined that the first write request RQ1 is not sequential to the pre-allocated streams, information (e.g., a logical block address and a data size) associated with the first write request RQ1 is provided to the fragment collecting module FCM.

The fragment collecting module FCM may manage, classify, or collect the first write request RQ1 in units of a fragment. For example, the fragment collecting module FCM may manage, classify, or collect write requests, which are not sequential to the pre-allocated streams, from among write requests received from the sequentiality detecting module SDM in units of the fragment. In an exemplary embodiment, the fragment collecting module FCM looks up a fragment sequential to a write request, by using a hash table.

When a fragment sequential to the write request received from the sequentiality detecting module SDM is not found, the fragment collecting module FCM may transfer information about the write request to the stream classifying module SCM. In an exemplary embodiment, the stream classifying module SCM allocates a stream identifier of a random stream to the write request received from the fragment collecting module FCM. In an embodiment, a random stream identifier may indicate any stream identifier. Alternatively, the random stream identifier may indicate a stream identifier of a stream different from the pre-allocated streams.

When a fragment sequential to the write request received from the sequentiality detecting module SDM is found, the fragment collecting module FCM may add the information about the write request to the found fragment.

When the number of requests included in a specific fragment, a size of the requests, the number of data included therein, or a size of the data is equal to or greater than a reference value, the fragment collecting module FCM may transfer attribute information about the specific fragment to the stream classifying module SCM. That is, the fragment collecting module FCM may classify, manage, or collect requests or data in units of a fragment until a size of the requests or data included in the same fragment reaches the reference value.

The stream classifying module SCM may be configured to identify a stream associated with a request, based on information received from the fragment collecting module FCM or the sequentiality detecting module SDM. For example, as described above, that information about a write request is received from the sequentiality detecting module SDM may mean that the write request is sequential to a specific stream. In this case, the stream classifying module SCM may allocate a stream identifier of the specific stream to the write request.

Alternatively, as described above, that information about a write request is received from the fragment collecting module FCM may mean that the write request is not sequential to the pre-allocated streams and is not sequential to fragments. In this case, the stream classifying module SCM may allocate a stream identifier of a random stream to the write request.

Alternatively, that attribute information of a specific fragment is received from the fragment collecting module FCM may mean that the specific fragment includes write requests, the number of which is equal to or more than the reference value, or write data, the size of which is equal to or more than the reference value. In this case, the stream classifying module SCM may allocate, to the specific fragment, a stream identifier of a stream corresponding to the specific fragment from among the pre-allocated streams based on attribute information of the specific fragment and the stream attribute table SAT. In an exemplary embodiment, an operation of allocating a stream identifier to a specific fragment is performed based on machine learning.

Figure 7:
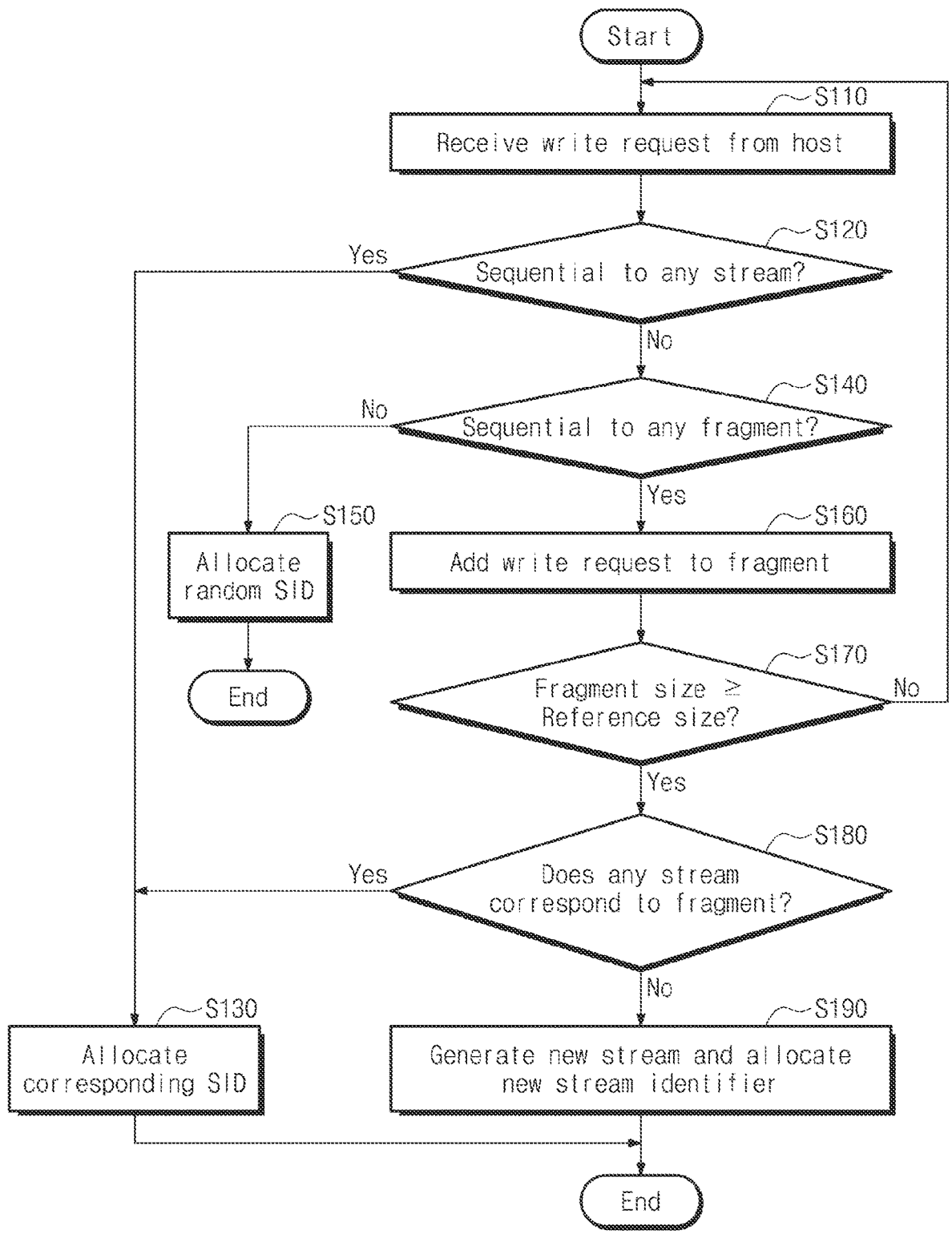
FIG. 7 is a flowchart illustrating a stream allocating operation of a storage controller of FIG. 1 according to an exemplary embodiment of the disclosure.

FIG. 7 is a flowchart illustrating a stream allocating operation of a storage controller of FIG. 1 according to an exemplary embodiment of the disclosure. For convenience of description, FIG. 7 is performed by the storage controller 110 of FIG. 1, but the present disclosure is not limited thereto.

Referring to FIGS. 1, 5, and 7, in operation S110, the storage controller 110 receives a write request from the host 11. In an embodiment, the write request may be received through signals that are based on a given interface protocol between the host 11 and the storage device 100. The write request may include information about a write command, write data, and a logical block address. In an embodiment, the write request does not include a stream identifier or stream information.

In operation S120, the storage controller 110 determines whether the received write request is sequential to pre-allocated streams. For example, the storage controller 110 may determine whether the write request is sequential to any stream of the pre-allocated streams, based on the logical block address of the write request and the stream attribute table SAT. In detail, as described with reference to FIGS. 5 and 6, the stream attribute table SAT may include statistical information about each of the pre-allocated streams. The stream attribute table SAT is described above, and thus, additional description will be omitted to avoid redundancy. In an embodiment, determining whether the received write request is sequential is performed by determining whether a region of a memory to program write data of the write request is one of a plurality of regions of the memory associated with the pre-allocated streams.

When the logical block address of the received write request is included in a logical block address range of a specific stream (i.e., a range from a starting logical block address to an end logical block address of the specific stream), the storage controller 110 determines that the received write request is sequential to the specific stream. In this case, the specific stream may be a sequential stream associated with the write request. In operation S130, the storage controller 110 allocates a stream identifier of the corresponding sequential stream (i.e., a stream determined as sequential) to the write request.

When a stream corresponding to the write request from among the pre-allocated streams included in the stream attribute table SAT does not exist (i.e., when a sequential stream associated with the write request does not exist), in operation S140, the storage controller 110 determines whether the write request is sequential to any fragment. For example, the storage controller 110 may determine whether the write request is sequential to any fragment, by checking the hash table based on the logical block address of the write request. Below, for convenience of description, that the write request is sequential to a specific fragment will be described as the write request corresponds to the specific fragment.

When a fragment corresponding to the write request does not exist (i.e., when a fragment sequential to the write request does not exist), in operation S150, the storage controller 110 allocates a random identifier to the write request. For example, that a sequential stream associated with the write request does not exist means that a stream corresponding to the write request is not previously allocated. Also, that a fragment corresponding to the write request does not exist indicates that any other write request having attributes similar to those of the received write request has not been received. Accordingly, the storage controller 110 may allocate a random identifier to the received write request. In an embodiment, after the random identifier is allocated, the hash table may be updated. That is, the write request to which the random identifier is allocated may be newly registered at the hash table.

When a fragment corresponding to the write request exists (i.e., when the write request is sequential to the corresponding fragment), in operation S160, the storage controller 110 adds the write request to the corresponding fragment. In an embodiment, to add a write request to the corresponding fragment means to add information about the write request or attributes of the write request to the hash table or to manage or store write data associated with the write request together with data associated with the corresponding fragment.

In operation S170, the storage controller 110 determines whether a size of write requests or data included in the corresponding fragment is equal to or larger than a reference size. In an embodiment, the reference size may indicate a program unit of the nonvolatile memory device 120. When the size of the write requests or data included in the corresponding fragment is not larger than the reference size, the storage controller 110 again performs operation S110. That is, the storage controller 110 may repeatedly perform operation S110 to operation S170 until the size of the write requests or data included in the corresponding fragment is equal to or larger than the reference size.

When the size of the write requests or data included in the corresponding fragment is equal to or larger than the reference size, in operation S180, the storage controller 110 determines whether a stream corresponding to the write requests included in the specific fragment exists. For example, the storage controller 110 may determine whether a stream corresponding to the specific fragment (i.e., a sequential stream associated with the specific fragment) exists, based on statistical information of a plurality of streams included in the stream attribute table SAT and statistical or attribute information of the specific fragment. In an embodiment, the storage controller 110 detects a stream having a feature similar to that of the statistical or attribute information of the specific fragment, based on machine learning.

When it is determined that a stream corresponding to the specific fragment exists, in operation S130, the storage controller 110 allocates a stream identifier of the found sequential stream (i.e., the corresponding stream) to the specific fragment.

When it is determined that a stream corresponding to the specific fragment does not exist, in operation S190, the storage controller 110 generates a new stream and allocates a stream identifier of the new stream to the specific fragment. In an embodiment, after operation S130, operation S150, or operation S190, the storage controller 110 may update the stream attribute table SAT based on information about the allocated stream.

In an embodiment, after a stream (i.e., a sequential stream or a random stream) is allocated to the write request or the fragment, the storage controller 110 performs address mapping such that data are stored in the nonvolatile memory device 120 for each stream to which the write request or the fragment is allocated. That is, the storage controller 110 may perform address mapping such that data of requests or fragments having the same stream are stored in the same group of a memory block of the nonvolatile memory device 120 and may control the nonvolatile memory device 120.

Accordingly, even though separate information (e.g., a stream identifier or stream information) about data is not provided from the host 11, the storage device 100 according to at least one embodiment of the present disclosure may classify and manage data in units of a stream. In this case, as described above, because the number of unnecessary maintenance operations of the nonvolatile memory device 120 decreases, the lifetime and performance of the storage device 100 may be improved.

Figure 8:
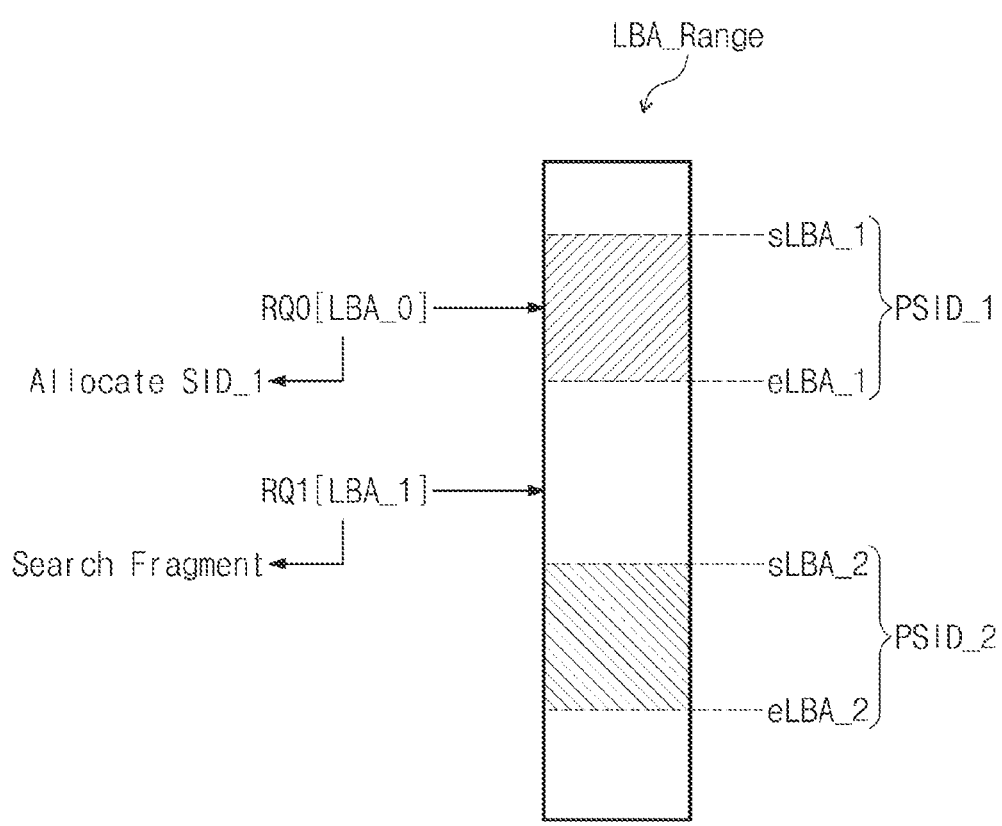
FIG. 8 is a diagram for describing operation S120 of FIG. 7.

FIG. 8 is a diagram for describing operation S120 of FIG. 7. For brevity of drawing and convenience of description, it is assumed that the storage controller 110 previously allocates a first stream SID_1 and a second stream SID_2. In an embodiment, an operation to be described with reference to FIG. 8 will be described on the basis of the storage controller 110, but the present disclosure is not limited thereto. For example, the operation to be described with reference to FIG. 8 may be performed by the stream manager 118 of the storage controller 110. Alternatively, the operation to be described with reference to FIG. 8 may be performed by the sequentiality detecting module SDM of the stream manager 118.

Referring to FIGS. 1, 7, and 8, the storage controller 110 detects a sequential stream associated with a request received from the host 11, based on a logical block address of the request. For example, as illustrated in FIG. 8, a storage space of the storage device 100 that is recognizable by the host 11 may correspond to a logical block address range LBA_Range. That is, the host 11 may manage the storage space of the storage device 100 through the logical block address range LBA_Range.

The storage controller 110 may receive a 0-th write request RQ0 having a 0-th logical block address LBA_0. In this case, the 0-th logical block address LBA_0 is included in a range from the first starting logical block address sLBA_1 to the first end logical block address eLBA_1. The first starting logical block address sLBA_1 and the first end logical block address eLBA_1 may correspond to the first stream SID_1. In this case, the storage controller 110 determines that the 0-th write request RQ0 having the 0-th logical block address LBA_0 is sequential to the first stream SID_1. That is, a sequential stream associated with the 0-th write request RQ0 having the 0-th logical block address LBA_0 may be the first stream SID_1. The storage controller 110 allocates a stream identifier (i.e., SID_1) of the first stream SID_1 to the 0-th write request RQ0 having the 0-th logical block address LBA_0. This may correspond to "Yes" in operation S120 of FIG. 7.

The storage controller 110 receives a first write request RQ1 having a first logical block address LBA_1. In this case, the first logical block address LBA_1 is not included in the available logical block address ranges (e.g., a range from sLBA_1 to eLBA_1 and a range from sLBA_2 to eLBA_2) respectively corresponding to the first stream SID_1 and the second stream SID_2. That is, a sequential stream associated with the first write request RQ1 having the first logical block address LBA_1 is absent from pre-allocated streams. In this case, the storage controller 110 may perform a fragment search operation (or a fragment collecting operation) on the first write request RQ1. This may correspond to "No" in operation S120 of FIG. 7.

As described above, the storage controller 110 may detect a sequential stream associated with a received write request from among the pre-allocated streams, based on the stream attribute table SAT. When the sequential stream is detected, the storage controller 110 may allocate the detected sequential stream to the received write request. When the sequential stream is not detected, the storage controller 110 may perform the fragment search operation or the fragment collecting operation on the received write request.

Figure 9:
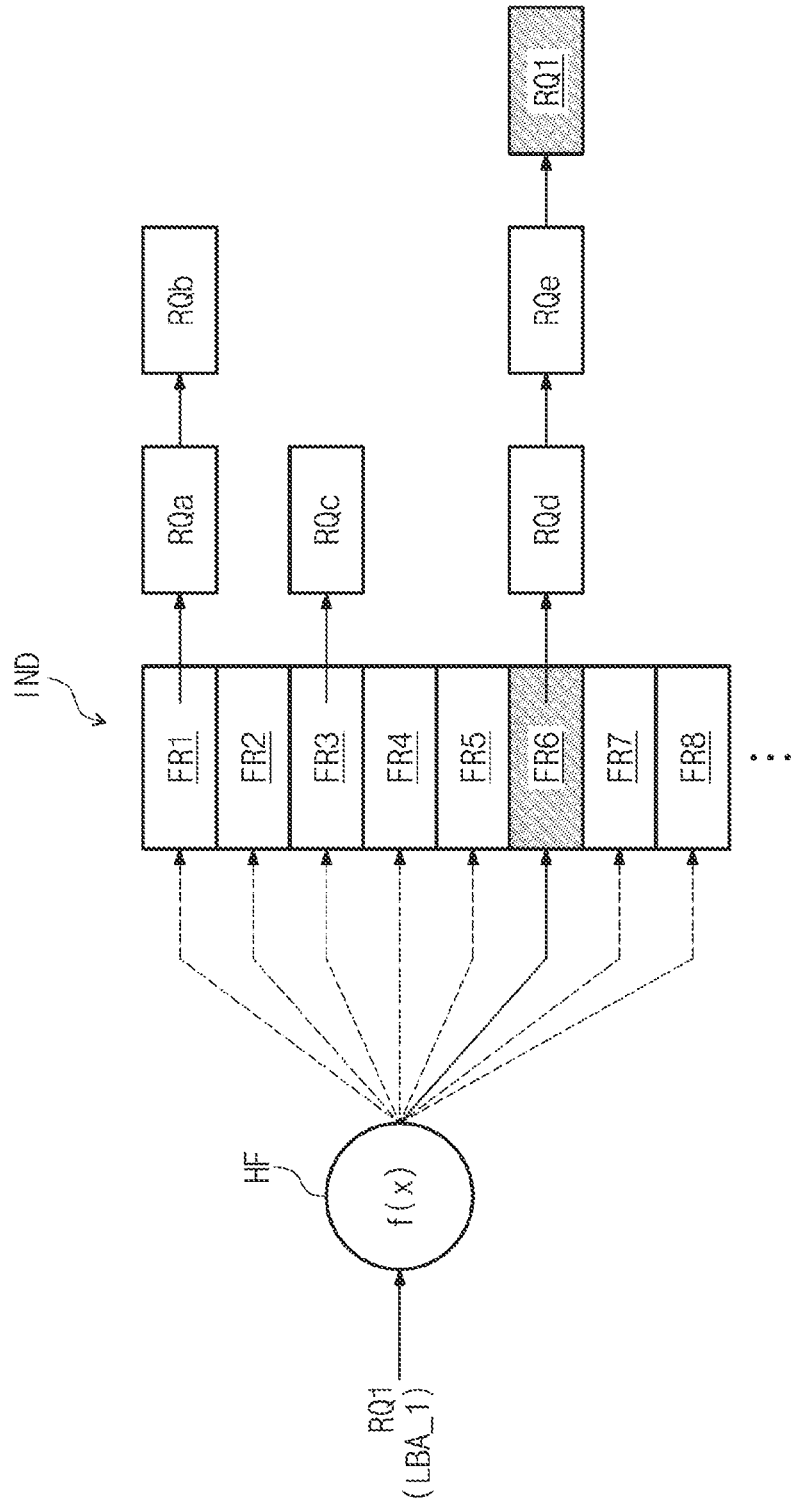
FIG. 9 is a diagram for describing operation S140 of FIG. 7.

FIG. 9 is a diagram for describing operation S140 of FIG. 7. In an embodiment, an operation to be described with reference to FIG. 9 will be described on the basis of the storage controller 110, but the present disclosure is not limited thereto. For example, the operation to be described with reference to FIG. 9 may be performed by the stream manager 118 of the storage controller 110. Alternatively, the operation to be described with reference to FIG. 9 may be performed by the fragment collecting module FCM of the stream manager 118.

Referring to FIGS. 5, 7, and 9, the fragment collecting module FCM receives information about the first write request RQ1 having the first logical block address LBA_1 from the sequentiality detecting module SDM. In an embodiment, it is determined by the sequentiality detecting module SDM that a sequential stream associated with the first write request RQ1 having the first logical block address LBA_1 does not exist.

The fragment collecting module FCM may look up a fragment sequential to the first write request RQ1 based on the first logical block address LBA_1. For example, the fragment collecting module FCM may perform a hash operation HF on the first logical block address LBA_1 and may compare a result of the hash operation with an index IND. The index IND may include a value corresponding to each of a plurality of fragments FR1 to FR8. Each of the plurality of fragments FR1 to FR8 may include information about a relevant write request(s). For example, the first fragment FR1 may include information about write requests RQa and RQb, the third fragment FR3 may include information about a write request RQc, and the sixth fragment FR6 may include information about write requests RQd and RQe.

In the case where the index IND coinciding with the result of the hash operation HF exists, the fragment collecting module FCM may add information about a write request to the index IND coinciding with the result of the hash operation HF. For example, in the embodiment of FIG. 9, the result of the hash operation HF may correspond to the sixth fragment FR6. In this case, the fragment collecting module FCM adds the information about the first write request RQ1 to the sixth fragment FR6.

As described above, the fragment collecting module FCM may search for a fragment sequential to a received write request and may add the write request to the found fragment. In other words, the fragment collecting module FCM may manage, collect, or accumulate write requests having similar features in units of a fragment.

In the case where the index IND coinciding with the result of the hash operation HF does not exist, the fragment collecting module FCM may transfer the information about the first write request RQ1 to the stream classifying module SCM, and the stream classifying module SCM may allocate a random stream identifier to the first write request RQ1. For example, if the result of the hash operation HF does not correspond to any of the available fragments, the fragment collecting module FCM may transfer the information about the first write request RQ1 to the stream classifying module SCM.

Figure 10:
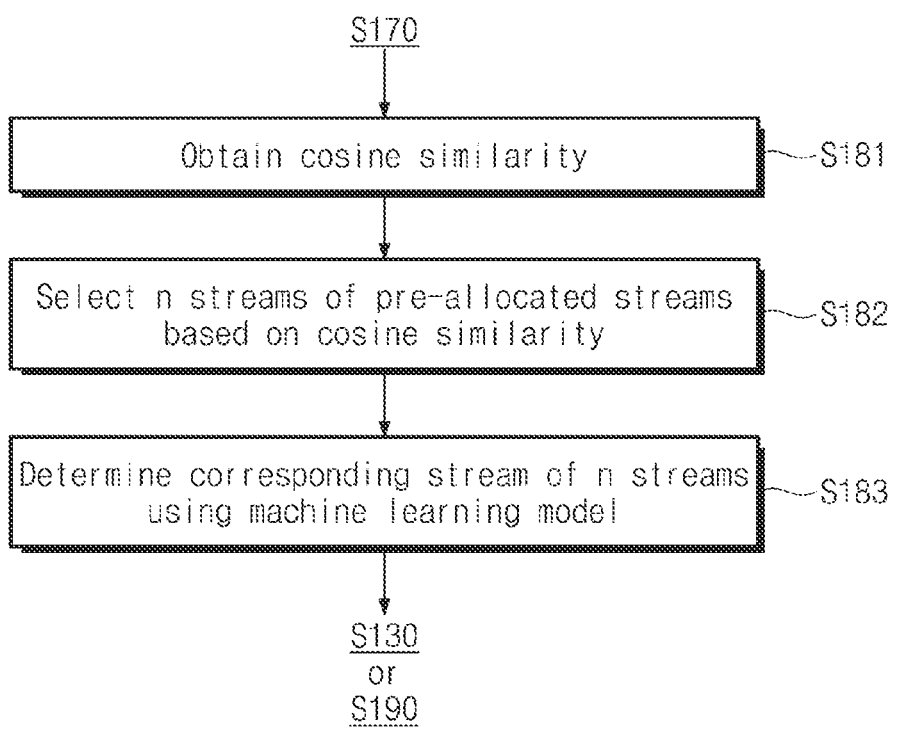
FIG. 10 is a flowchart illustrating operation S180 of FIG. 7 according to an exemplary embodiment of the disclosure.

FIG. 10 is a flowchart illustrating operation S180 of FIG. 7 according to an exemplary embodiment. In an embodiment, an operation to be described with reference to FIG. 10 will be described on the basis of the storage controller 110, but the present disclosure is not limited thereto. For example, the operation to be described with reference to FIG. 10 may be performed by the stream manager 118 of the storage controller 110. Alternatively, the operation to be described with reference to FIG. 10 may be performed by the stream classifying module SCM of the stream manager 118.

Below, for convenience of description, the term "collected fragment" is used. The collected fragment may indicate a fragment in which write requests or write data are collected or accumulated by the fragment collecting module FCM as much as a reference value or more. However, the present disclosure is not limited thereto.

Referring to FIGS. 1, 7, and 10, operation S180 may include operation S181, operation S182, and operation S183. In operation S181, the storage controller 110 obtains a cosine similarity. For example, the storage controller 110 may obtain the cosine similarity between the collected fragment and each pre-allocated stream based on attribute information of the collected fragment and the stream attribute table SAT. Operation S181 will be more fully described with reference to FIG. 11.

In operation S182, the storage controller 110 selects "n" streams of the pre-allocated streams based on the cosine similarity. For example, the storage controller 110 may select "n" streams having a high cosine similarity from among the pre-allocated streams. In an embodiment, "n" may be "3", but the present disclosure is not limited thereto. For example, the pre-allocated streams having a cosine similarity higher than a certain threshold may correspond to the "n" streams having the high cosine similarity.

In operation S183, the storage controller 110 determines a stream (i.e., a sequential stream associated with the collected fragment) corresponding to the collected fragment from among the selected "n" streams by using machine learning. The storage controller 110 may perform operation S130 or operation S190 depending on a result of operation S183.

Figure 11:
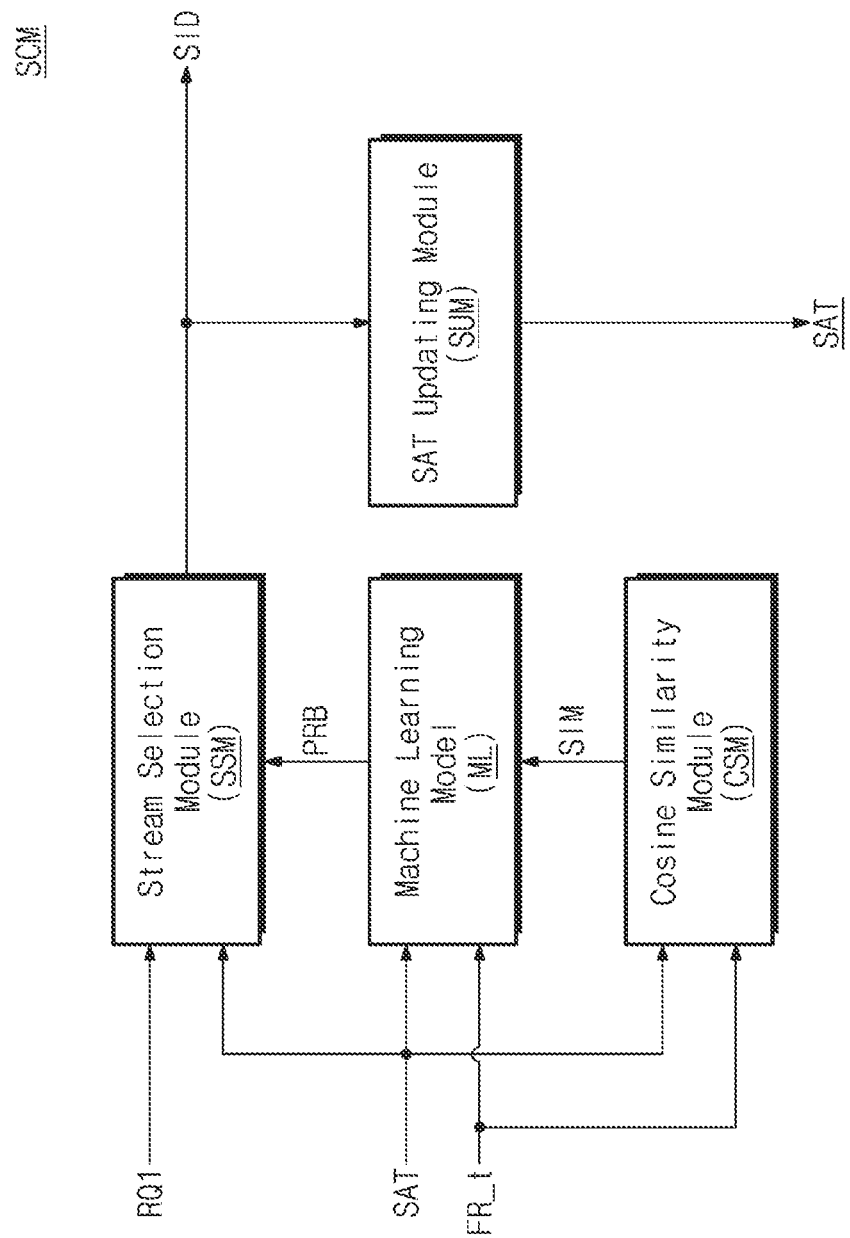
FIG. 11 is a block diagram illustrating a stream classifying module of FIG. 5.
Figure 12:
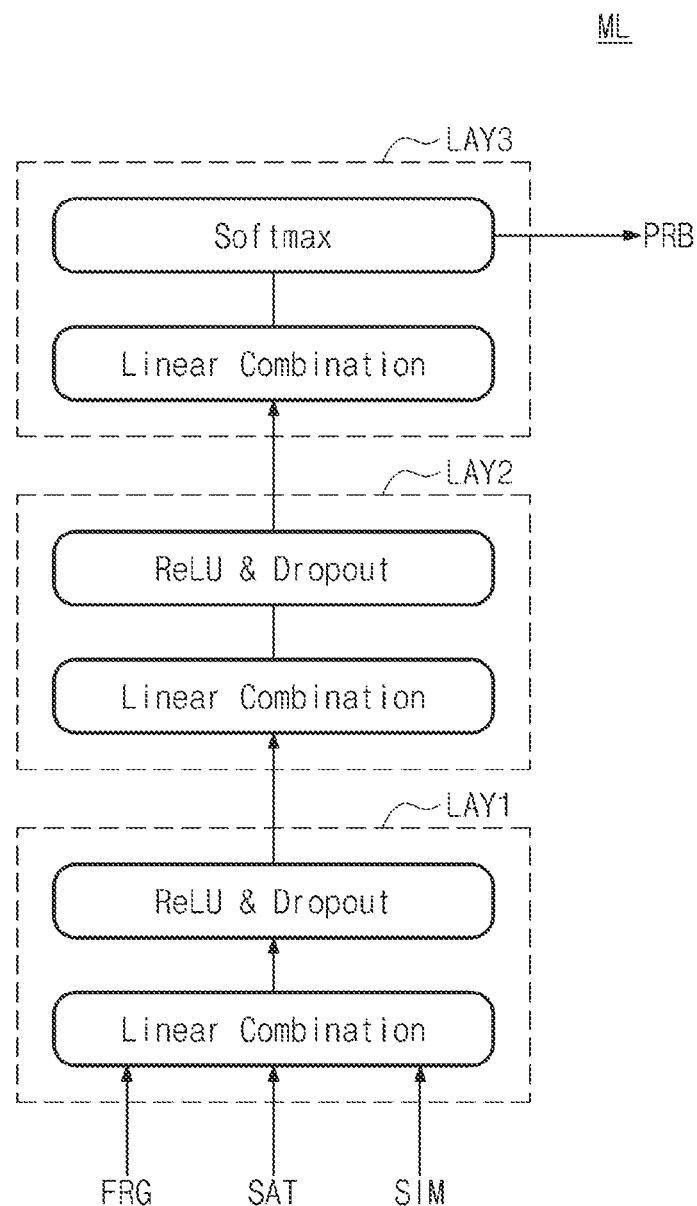
FIG. 12 is a diagram illustrating a machine learning model of FIG. 11.

FIG. 11 is a block diagram illustrating a stream classifying module of FIG. 5 according to an embodiment of the disclosure. FIG. 12 is a diagram illustrating a machine learning model of FIG. 11 according to an embodiment of the disclosure. Referring to FIGS. 5, 10, 11, and 12, the stream classifying module SCM includes a cosine similarity module CSM, a machine learning model ML, a stream selection module SSM, and an SAT updating module SUM. As described above, the stream classifying module SCM may be configured to allocate a sequential stream or a random stream associated with the first write request RQ1 received from the sequentiality detecting module SDM or the fragment collecting module FCM or to allocate a stream corresponding to the collected fragment received from the fragment collecting module FCM.

First, an operation of allocating a sequential stream associated with the first write request RQ1 received from the sequentiality detecting module SDM will be described. As described above, in the case where a sequential stream associated with the first write request RQ1 is detected by the sequentiality detecting module SDM, the stream classifying module SCM receives the information about the first write request RQ1 from the sequentiality detecting module SDM. In this case, the stream classifying module SCM may allocate the sequential stream associated with the first write request RQ1 based on the stream attribute table SAT.

Next, an operation of allocating a random stream associated with the first write request RQ1 received from the fragment collecting module FCM will be described. As described above, that the first write request RQ1 is received from the fragment collecting module FCM means that both a stream and a fragment sequential to the first write request RQ1 does not exist. In this case, the stream selection module SSM may allocate a random stream to the first write request RQ1.

Then, an operation of allocating a stream to the collected fragment received from the fragment collecting module FCM will be described. The stream classifying module SCM receives information about the collected fragment (hereinafter referred to as "target fragment information") FR_t from the fragment collecting module FCM. The cosine similarity module CSM of the stream classifying module SCM may calculate a cosine similarity of the target fragment information FR_t to each pre-allocated stream, based on the target fragment information FR_t and the stream attribute table SAT.

For example, as described above, the stream attribute table SAT may include information about the size vector SV of each pre-allocated stream. The target fragment information FR_t may include information about a size and a frequency of write requests or write data included in a target fragment. A cosine similarity expressed by Equation 2 below may be calculated based on the above-described information.

$$\cos\theta = \frac{A \cdot B}{\|A\|\|B\|} = \frac{\sum_{i=1}^{n} a_i b_i}{\sqrt{\sum_{i=1}^{n} a_i^2} \sqrt{\sum_{i=1}^{n} b_i^2}} \quad \text{[Equation 2]}$$

In Equation 2 above, "cos θ" indicates a cosine similarity, and "A" and "B" indicate the size vector SV of each pre-allocated stream and a vector for a size and a frequency of write requests included in a target fragment. The cosine similarity based on Equation 2 may have a magnitude between −1 and 1. In an embodiment, a value of the cosine similarity SIM close to "−1" means that two vectors are not similar and a value of the cosine similarity SIM close to "1" means that two vectors are similar.

In an embodiment, statistically, that a distribution associated with a size and a frequency of write requests included in a target fragment is similar to a distribution of a size vector of a specific stream of pre-allocated streams may mean that the probability that the target fragment is sequential to the specific stream is high or exceeds a certain threshold probability. That is, some streams having a distribution similar to that of a target fragment from among pre-allocated streams may be selected based on the above-described cosine similarity. In an embodiment, the selected streams may be "n" streams having a cosine similarity closest to "1" from among the pre-allocated streams. In an embodiment, "n" may be "3", but the present disclosure is not limited thereto.

After the "n" streams of the pre-allocated streams are selected, the stream classifying module SCM may determine a stream corresponding to the target fragment from among the "n" streams based on the machine learning model ML.

For example, the machine learning model ML may include three layers LAY1, LAY2, and LAY3 as illustrated in FIG. 12. The first layer LAY1 may include a linear combination layer and a ReLU & Dropout layer. The second layer LAY2 may include a linear combination layer and a ReLU & Dropout layer. The third layer LAY3 may include a linear combination layer and a soft max layer.

An operation of the first to third layers LAY1 to LAY3 may be expressed by Equation 3 below.

$$L_1 = \max(0, xW_1 + b_1)$$

$$L_2 = \max(0, L_1 W_2 + b_2)$$

$$\text{out} = \text{softmax}(L_2 W_2 + b_2) \qquad \text{[Equation 3]}$$

In Equation 3 above, "L1" may indicate an output of the first layer LAY1, "L2" may indicate an output of the second layer LAY2, and "out" may indicate an output of the third layer LAY3, that is, a probability value PRB. In each layer, "x" indicates a vector input to each layer, "Wk" (e.g., $W_1$, $W_2$, $W_3$) indicates a hidden vector of each layer, and "bk" (e.g., $b_1$, $b_2$, $b_3$) indicates a bias of each layer.

That is, the statistical information of the stream attribute table SAT, the target fragment information FR_t, and the cosine similarity SIM may be input to the machine learning model ML. In an embodiment, through the machine learning model ML, "n" streams, of which the cosine similarity SIM is the closest to "1", may be selected, and the probability value PRB may be calculated by performing machine learning on statistical information (i.e., statistical information obtained from the stream attribute table SAT) of the selected streams and the target fragment information FR_t.

In an embodiment, the target fragment information FR_t may include information similar to statistical information included in the stream attribute table SAT. For example, the target fragment information FR_t may include a starting logical block address, an end logical block address, a starting time, an end time, a throughput, and a size vector of a target fragment. That is, the machine learning model ML may be configured or trained to detect a stream having statistical information the same as or similar to that of the target fragment information FR_t. In an embodiment, the machine learning model ML may be in advance learned/trained and may be additionally trained while a stream allocating operation is performed.

In an embodiment, the probability value PRB is a value in which the possibility that a target fragment corresponds to each of the selected "n" streams is expressed in the form of a vector.

In an embodiment, the machine learning model ML is based on a decision tree model, but the present disclosure is not limited thereto. For example, the machine learning model ML could be an artificial neural network.

The stream selection module SSM may allocate a stream for the target fragment based on the probability value PRB. For example, the stream selection module SSM may determine which stream is a sequential stream associated with the target fragment, based on the probability value PRB. The stream selection module SSM may allocate the selected sequential stream to the target fragment. In an embodiment, in the case where the stream selection module SSM fails to determine that a sequential stream is associated with the target fragment based on the probability value PRB (i.e., in the case where a sequential stream associated with the target fragment does not exist), the stream selection module SSM generates a new stream, generates a new stream identifier corresponding to the new stream, and allocate the new stream identifier to the target fragment.

In an embodiment, after a stream is allocated, the SAT updating module SUM updates the stream attribute table SAT such that information about the allocated stream is registered/stored therein.

As described above, the stream classifying module SCM according to an embodiment of the present disclosure may collect fragmented write requests based on a specific condition (i.e., a sequentiality of a logical block address) and may allocate or classify a stream to the collected write requests. In this case, the stream classifying module SCM may select some streams of pre-allocated streams based on the cosine similarity described above and may allocate a stream to the collected write requests by performing machine learning on the selected streams. That is, because a learning or a calculation is performed on some of the pre-allocated streams, and not all the pre-allocated streams, the amount of computations may decrease. Accordingly, the amount of computations of the stream classifying module SCM may decrease, and the stream classifying module SCM may become small-sized.

Figure 13:
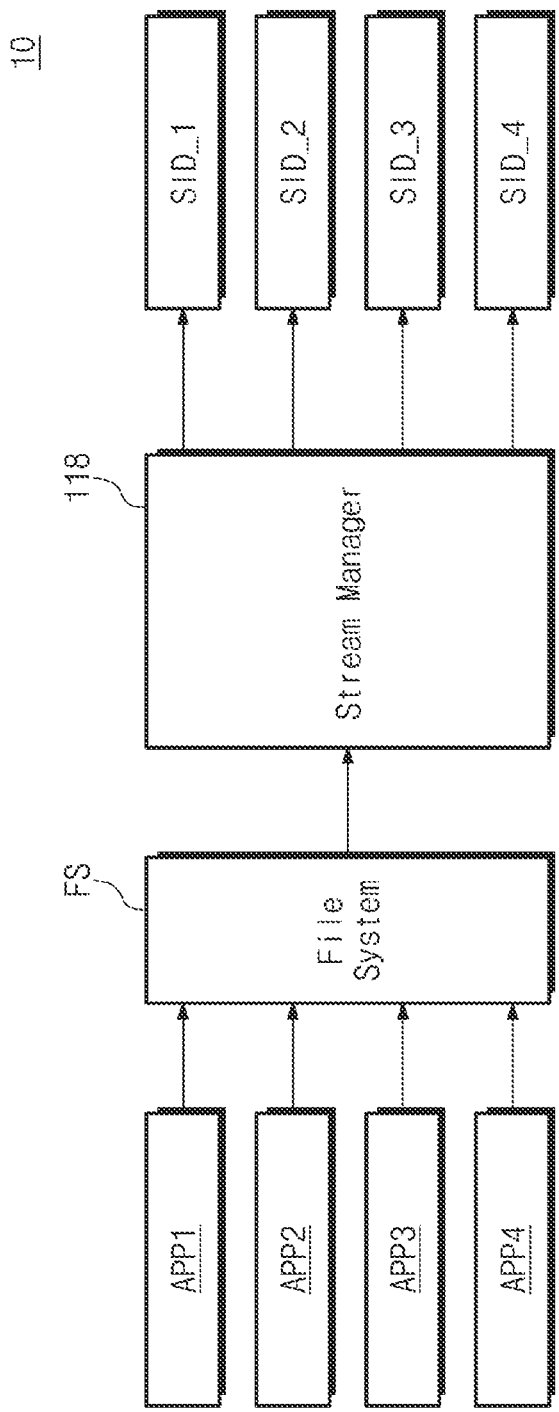
FIG. 13 is a block diagram illustrating a storage system to which a storage device according to an exemplary embodiment of the present disclosure is applied.

FIG. 13 is a block diagram illustrating a storage system to which a storage device according to the present disclosure may be applied. A configuration of a storage system of FIG. 13 may be similar to the configuration of the storage system 10 of FIG. 1. However, to describe an embodiment of the present disclosure more clearly, a storage system is conceptually illustrated.

Referring to FIGS. 1 and 13, a plurality of applications APP1 to APP4 may be driven by the storage system 10. In an embodiment, the plurality of applications APP1 to APP4 may be driven on the host 11. In an embodiment, the host 11 may be implemented with a multi-tenant, and the plurality of applications APP1 to APP4 may be driven on different tenants, respectively.

Each of the plurality of applications APP1 to APP4 may be configured to access the storage device 100 through a file system FS. In an embodiment, files or data respectively generated by the plurality of applications APP1 to APP4 may have different features. However, in the case where the plurality of applications APP1 to APP4 access the storage device 100 through the same file system FS, unless separate information (e.g., stream information managed by the host 11) is provided, the storage device 100 may manage the files or data respectively generated by the plurality of applications APP1 to APP4 in a general manner. In this case, because the files or data respectively generated by the plurality of applications APP1 to APP4 are not classified within the nonvolatile memory device 120, a maintenance operation may be frequently performed.

In contrast, the stream manager 118 of the storage device 100 according to an embodiment of the present disclosure classifies the files or data respectively generated by the plurality of applications APP1 to APP4 into a plurality of streams SID_1 to SID_4 based on the stream allocating method described with reference to FIGS. 1 to 12. That is, the file or data generated by the first application APP1 may be classified as the first stream SID_1, the file or data generated by the second application APP2 may be classified as the second stream SID_2, the file or data generated by the third application APP3 may be classified as the third stream SID_3, or the file or data generated by the fourth application APP4 may be classified as the fourth stream SID_4. In this case, because files or data generated by one application are managed by using the same stream, the number of maintenance operations of the nonvolatile memory device 120 may decrease, or a WAF characteristic may be improved.

Figure 14:
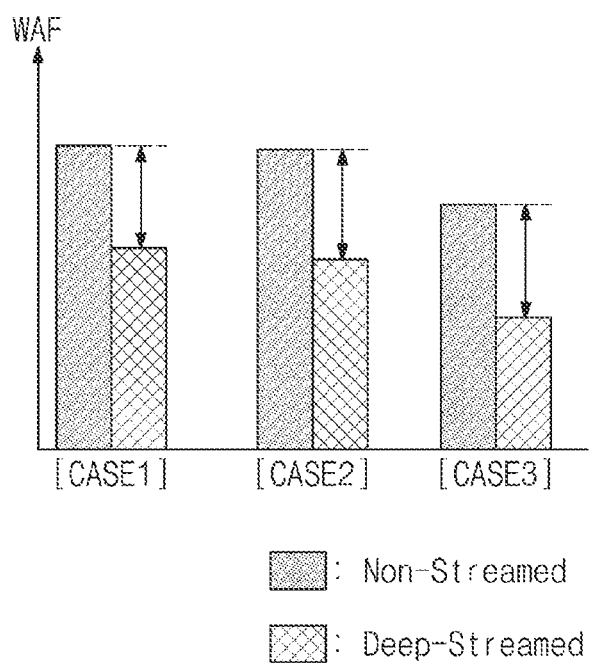
FIG. 14 is a diagram for describing improved performance of a storage device according to the present disclosure.

FIG. 14 is a diagram for describing increased performance of a storage device according to the present disclosure. As described above, the storage device 100 according to the present disclosure may classify, allocate, or manage a stream associated with input data based on attributes of the input data and statistical information of pre-allocated streams without separate information (e.g., stream classification information) from the host 11. In this case, the number of maintenance operations to be performed at the storage device 100 may decrease, or the WAF characteristic may be improved.

For example, a graph of FIG. 14 shows a result measured by using a YAHOO cloud serving benchmark (YCSB). A first case CASE1 corresponds to a result associated with a workload where a ratio of Insert and a read-modify-write (RMW) is 50:50, a second case CASE2 corresponds to a result associated with a workload where a ratio of Insert and RMW is 25:75, and a third case CASE3 corresponds to a result associated with a workload where a ratio of Insert and RMW is 10:90. As understood from the graph of FIG. 14, compared to the case (i.e., non-streamed) where stream allocation is not performed on input data, a WAF magnitude may decrease when the stream manager 118 according to at least one embodiment of the present disclosure is applied (i.e., Deep-streamed). That is, in the case where a stream manager or a stream allocating method according to at least one embodiment of the present disclosure is applied, the performance and lifetime of a storage device may be improved.

Figure 15:
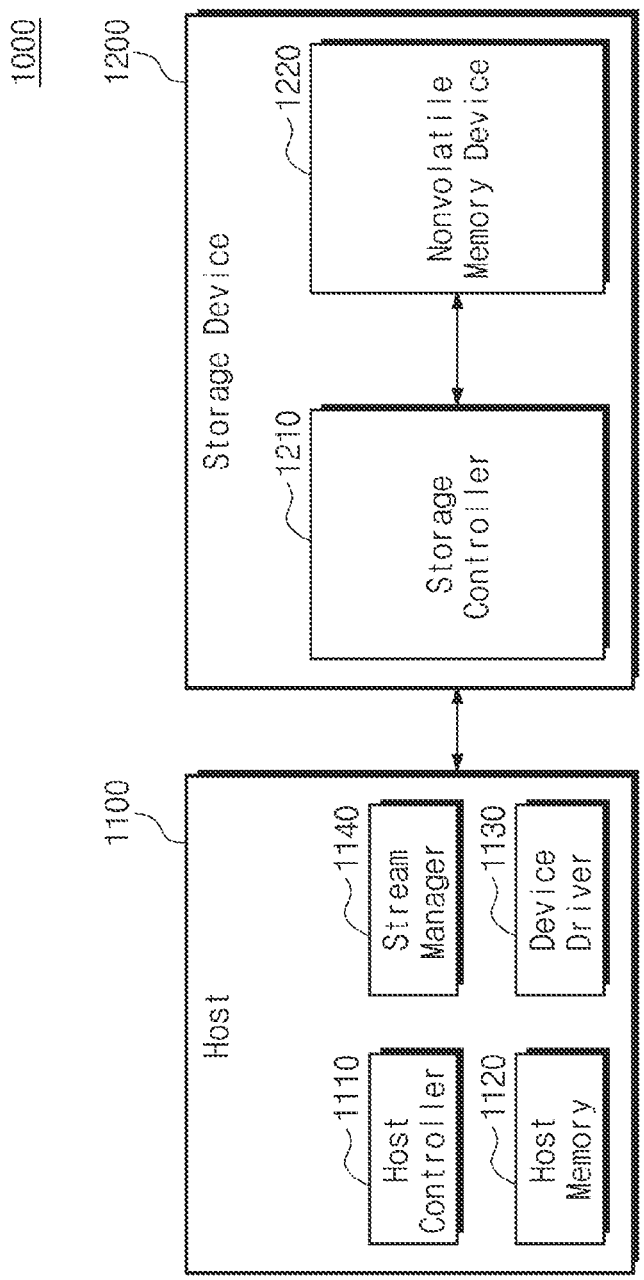
FIG. 15 is a block diagram illustrating a storage system according to an exemplary embodiment of the present disclosure.

FIG. 15 is a block diagram illustrating a storage system according to an exemplary embodiment of the present disclosure. For convenience, additional descriptions associated with the components described above will be omitted to avoid redundancy. Referring to FIG. 15, a storage system 1000 includes a host 1100 and a storage device 1200. The host 1100 may include a host controller 1110, a host memory 1120, a device driver 1130, and a stream manager 1140. The storage device 1200 includes a storage controller 1210 and a nonvolatile memory device 1220.

In an embodiment described with reference to FIGS. 1 to 14, a storage device may manage a stream associated with a write request; but, in the embodiment of FIG. 15, the host 1100 is configured to manage a stream associated with data to be stored in the storage device 1200. In an embodiment, the stream manager 1140 of the host 1100 may be the stream manager 118 described with reference to FIGS. 1 to 14 or may operate based on the stream allocating method described with reference to FIGS. 1 to 14.

In an embodiment, information about a stream allocated by the stream manager 1140 of the host 1100 is provided to the storage device 1200 together with a write request.

In an embodiment, the storage device 1200 is configured to manage data based on the stream information provided from the host 1100. In an embodiment, the storage device 1200 is configured to internally manage an internal stream associated with write requests, separately from the stream information provided from the host 1100. In this case, the storage device 1200 may manage the internal stream based on the stream allocating method described with reference to FIGS. 1 to 14.

Figure 16:
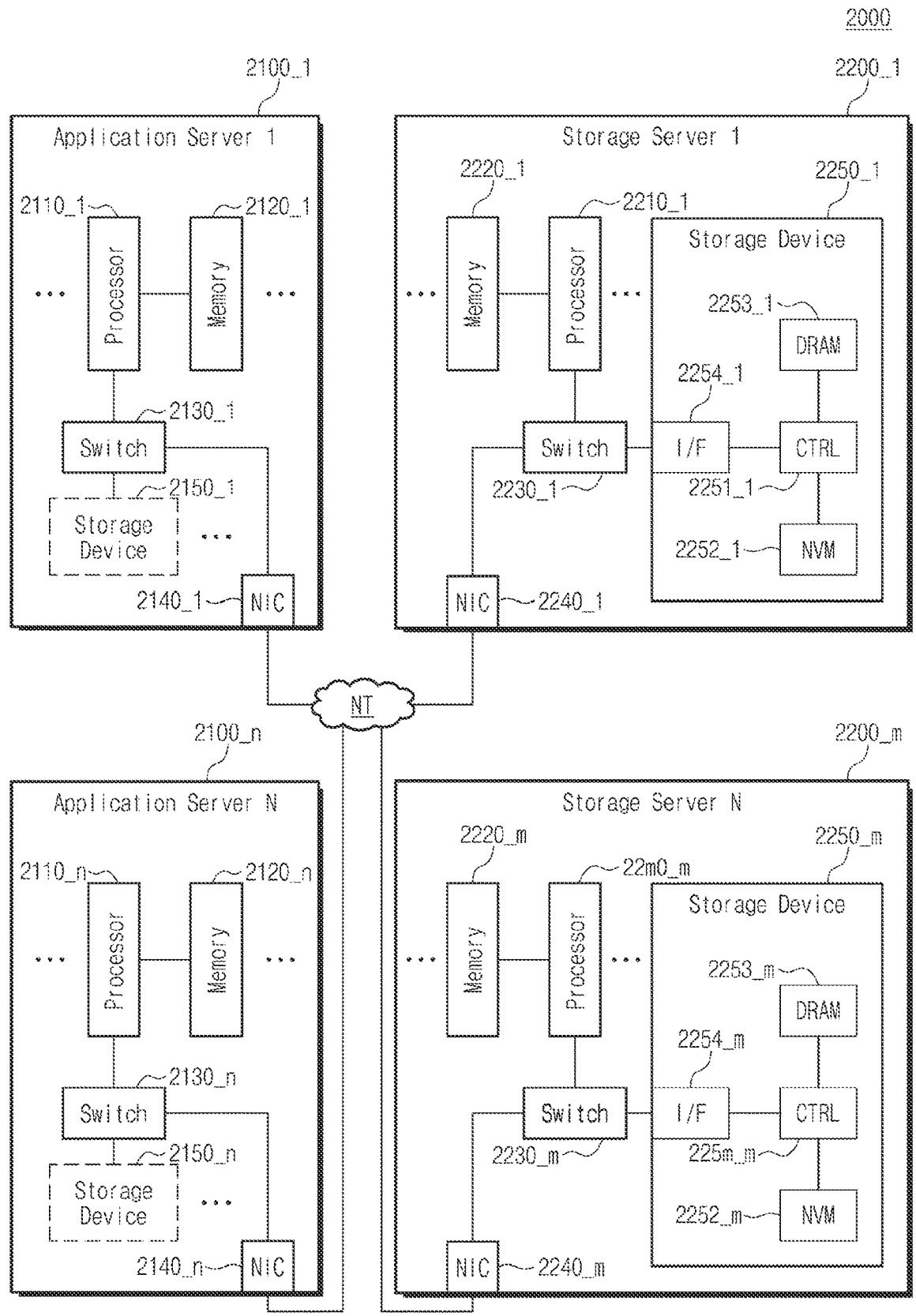
FIG. 16 is a block diagram illustrating a data center to which a storage device according to an exemplary embodiment of the present disclosure is applied.

FIG. 16 is a block diagram illustrating a data center to which a storage device according to an exemplary embodiment of the present disclosure may be applied. A data center 2000 that is a facility maintaining a variety of data and providing various services to the data may be referred to as a "data storage center". The data center 2000 may be a system for a search engine or database management or may be a computing system used in various institutions. The data center 2000 may include a plurality of application servers 2100_1 to 2100_n and a plurality of storage servers 2200_1 to 2200_m. The number of application servers 2100_1 to 2100_n and the number of storage servers 2200_1 to 2200_m may be variously changed or modified.

Below, for convenience of description, the first storage server 2200_1 will be described by way of example. Each of the remaining storage servers 2200_2 to 2200_m and the plurality of application servers 2100_1 to 2100_n may have a structure similar to that of the first storage server 2200_1.

The first storage server 2200_1 includes a processor 2210_1, a memory 2220_1, a switch 2230_1, a network interface connector (NIC) 2240_1, and a storage device 2250_1. The processor 2210_1 may control overall operations of the first storage server 2200_1. The memory 2220_1 may store various instructions or data under control of the processor 2210_1. The processor 2210_1 may be configured to access the memory 2220_1 to execute various instructions or to process data. In an embodiment, the memory 2220_1 may include at least one of various kinds of memory devices such as a Double Data Rate Synchronous DRAM (DDR SDRAM), a High Bandwidth Memory (HBM), a Hybrid Memory Cube (HMC), a Dual In-line Memory Module (DIMM), an Optane DIMM, or a Non-Volatile DIMM (NVDIMM).

In an embodiment, the number of processors 2210_1 included in the first storage server 2200_1 and the number of memories 2220_1 included in the first storage server 2200_1 may be variously changed or modified. In an embodiment, the processor 2210_1 and the memory 2220_1 included in the first storage server 2200_1 may constitute a processor-memory pair, and the number of processor-memory pairs included in the first storage server 2200_1 may be variously changed or modified. In an embodiment, the number of processors 2210_1 included in the first storage server 2200_1 may be different from the number of memories 2220_1 included in the first storage server 2200_1. The processor 2210_1 may include a single core processor or a multi-core processor.

Under control of the processor 2210_1, the switch 2230_1 may selectively connect the processor 2210_1 and the storage device 2250_1 or may selectively connect the NIC 2240_1 and the storage device 2250_1.

The NIC 2240_1 may connect the first storage server 2200_1 with a network NT. The NIC 2240_1 may include a network interface card or a network adapter. The NIC 2240_1 may be connected with the network NT through a wired interface, a wireless interface, a Bluetooth interface, or an optical interface. The NIC 2240_1 may include at least one of an internal memory, a digital signal processor (DSP), and a host bus interface, and may be connected with the processor 2210_1 or the switch 2230_1 through the host bus interface. The host bus interface may include at least one of various interfaces such as an Advanced Technology Attachment (ATA) interface, a Serial ATA (SATA) interface, an external SATA (e-SATA) interface, a Small Computer Small Interface (SCSI) interface, a Serial Attached SCSI (SAS) interface, a Peripheral Component Interconnection (PCI) interface, a PCI express (PCIe) interface, an NVM express (NVMe) interface, an IEEE 1394 interface, a Universal Serial Bus (USB) interface, a Secure Digital (SD) card interface, a Multi-Media Card (MMC) interface, an embedded Multi-Media Card (eMMC) interface, a Universal Flash Storage (UFS) interface, an embedded Universal Flash Storage (eUFS) interface, and a Compact Flash (CF) card interface. In an embodiment, the NIC 2240_1 may be integrated with at least one of the processor 2210_1, the switch 2230_1, and the storage device 2250_1.

Under control of the processor 2210_1, the storage device 2250_1 may store data or may output the stored data. The storage device 2250_1 may include a controller 2251_1, a nonvolatile memory 2252_1, a DRAM 2253_1, and an interface 2254_1. In an embodiment, the storage device 2250_1 may further include a secure element (SE) for security or privacy.

The controller 2251_1 may control overall operations of the storage device 2250_1. In an embodiment, the controller 2251_1 may include an SRAM. In response to signals received through the interface 2254_1, the controller 2251_1 may store data in the nonvolatile memory 2252_1 or may output data stored in the nonvolatile memory 2252_1. In an embodiment, the controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary for the controller 2251_1 to operate. The interface 2254_1 may provide a physical connection between the controller 2251_1 and the processor 2210_1, the switch 2230_1, or the NIC 2240_1. In an embodiment, the interface 2254_1 may be implemented to support a Direct-Attached Storage (DAS) manner that allows the direct connection of the storage device 2250_1 through a dedicated cable. In an embodiment, the interface 2254_1 may be implemented based on at least one of the above-described interfaces through a host interface bus.

The above components of the first storage server 2200_1 are exemplary, and the present disclosure is not limited thereto. The above components of the first storage server 2200_1 may be applied to each of the remaining storage servers 2200_2 to 2200_m or each of the plurality of application servers 2100_1 to 2100_n. In an embodiment, in the respective application servers 2100_1 to 2100_n, the storage device 2150_1 may be selectively omitted.

The plurality of application servers 2100_1 to 2100_n and the plurality of storage servers 2200_1 to 2200_m may communicate with each other through the network NT. The network NT may be implemented by using a Fibre channel (FC) or an Ethernet. In this case, the FC may be a medium that is used in high-speed data transmission and may use an optical switch providing high performance/high availability. Depending on an access manner of the network NT, the storage servers 2200_1 to 2200_m may be provided as file storage, block storage, or object storage.

In an embodiment, the network NT may be a storage dedicated network such as a storage area network (SAN). For example, the SAN may be an FC-SAN that uses an FC network and is implemented in compliance with an FC protocol (FCP). Alternatively, the SAN may be an IP-SAN that uses a TCP/IP network and is implemented in compliance with an iSCSI (or SCSI over TCP/IP or an Internet SCSI) protocol. In an embodiment, the network NT may be a general network such as a TCP/IP network. For example, the network NT may be implemented in compliance with a protocol such as FC over Ethernet (FCoE), Network Attached Storage (NAS), or NVMe over Fabrics (NVMe-oF).

In an embodiment, at least one of the plurality of application servers 2100_1 to 2100_n may be configured to access at least one of the remaining application servers or at least one of the plurality of storage servers 2200_1 to 2200_m through the network NT.

For example, the first application server 2100_1 may store data requested by a user or a client in at least one of the plurality of storage servers 2200_1 to 2200_m through the network NT. Alternatively, the first application server 2100_1 may obtain data requested by the user or the client from at least one of the plurality of storage servers 2200_1 to 2200_m through the network NT. In this case, the first application server 2100_1 may be implemented with a web server or a database management system (DBMS).

That is, a processor 2110_1 of the first application server 2100_1 may access a memory (e.g., 2120_n) or a storage device (e.g., 2150_n) of another application server (e.g., 2100_n) through the network NT. Alternatively, the processor 2110_1 of the first application server 2100_1 may access the memory 2220_1 or the storage device 2250_1 of the first storage server 2200_1 through the network NT. As such, the first application server 2100_1 may perform various operations on data stored in the remaining application servers 2100_2 to 2100_n or the plurality of storage servers 2200_1 to 2200_m. For example, the first application server 2100_1 may execute or issue an instruction for moving or copying data between the remaining application servers 2100_2 to 2100_n or between the plurality of storage servers 2200_1 to 2200_m. In this case, data targeted for movement or copy may be moved from the storage devices 2250_1 to 2250_m of the storage servers 2200_1 to 2200_m to the memories 2120_1 to 2120_n of the application servers 2100_1 to 2100_n through the memories 2220_1 to 2220_m of the storage servers 2200_1 to 2200_m or directly. Data transferred through the network NT may be data that is encrypted for security or privacy.

In an embodiment, the storage servers 2200_1 to 2200_m or the storage devices 2150_1 to 2150_n and 2250_1 to 2250_m described above may include a stream manager according to an embodiment of the present disclosure. That is, at least one of the storage servers 2200_1 to 2200_m or the storage devices 2150_1 to 2150_n and 2250_1 to 2250_m may be configured to allocate and manage a stream associated with input data based on the method described with reference to FIGS. 1 to 15.

According to an embodiment of the present disclosure, a storage device may allocate a stream for a write request received from a host, based on machine learning. Accordingly, because write requests having similar features are managed by using the same stream, the performance and lifetime of the storage device may be improved.

While the present disclosure has been described with reference to embodiments thereof, it will be apparent to those of ordinary skill in the art that various changes and modifications may be made thereto without departing from the spirit and scope of the present disclosure.

What is claimed is:

1. An operation method of a storage device including a nonvolatile memory device, the method comprising:
receiving a first write request from an external host;
adding the first write request to a first fragment;
selecting "n" streams among a plurality of pre-allocated streams having a cosine similarity higher than a threshold with respect to the first fragment when a size of the first fragment is greater than or equal a reference value, where "n" is a natural number of at least two;
applying statistical information of the "n" streams and the first fragment to a machine learning model to detect a first sequential stream associated with the first fragment from among the "n" streams;
allocating a stream identifier of the first sequential stream to the first fragment; and
storing, in the nonvolatile memory device, write data included in the first fragment based on the allocated stream identifier of the first sequential stream.

2. The method of claim 1, wherein the cosine similarity is calculated based on a first size vector indicating a size and frequency of data included in each of the pre-allocated streams and a second size vector indicating a size and frequency of the write data included in the first fragment.

3. The method of claim 2, wherein the "n" streams are streams each having the calculated cosine similarity the closest to "1" from among the pre-allocated streams.

4. The method of claim 1, wherein the statistical information includes a starting logical block address, an end logical block address, a starting time, an end time, a throughput, and a size vector of data included in each of least "n" streams, and wherein the statistical information further includes a starting logical block address, an end logical block address, a starting time, an end time, a throughput, and a size vector of the write data included in the first fragment.

5. The method of claim 1, further comprising:
updating a stream attribute table including statistical information of the pre-allocated streams after the stream identifier of the first sequential stream is allocated to the first fragment.

6. The method of claim 1, wherein the adding of the first write request to the first fragment comprises:
performing a hash operation on a logical block address of the first write request; and
searching a hash table for an index corresponding to a result of the hash operation, wherein the first write request is selectively added to the first fragment based on a result of the searching.

7. The method of claim 1, further comprising:
before the first write request is added to the first fragment, searching for a second sequential stream associated with the first write request from among the pre-allocated streams, based on a logical block address of the first write request and a logical block address range of each of the pre-allocated streams, wherein, when a stream corresponding to the first write request is not found, the adding of the first write request to the first fragment is performed.

8. The method of claim 7, further comprising:
when the logical block address of the first write request is included in a logical block address range of the second sequential stream, allocating a stream identifier of the second sequential stream to the first write request.

9. The method of claim 1, further comprising:
receiving a second write request from the external host;
allocating a stream identifier of a second sequential stream associated with the second write request from among the pre-allocated streams, based on a logical block address of the second write request and a logical block address range of each of the pre-allocated streams; and
storing, in the nonvolatile memory device, write data included in the second write request based on the stream identifier of the second sequential stream, wherein, when the second sequential stream and the first sequential stream are different from each other, the write data included in the first fragment and the write data included in the second write request are stored in different memory blocks of the nonvolatile memory device.

10. The method of claim 1, wherein a plurality of data included in the first sequential stream have sequential logical block addresses.

11. The method of claim 1, wherein a size of data included in each of the pre- allocated streams is equal to or larger than a size of the write data included in the first fragment.

12. A storage controller configured to control a nonvolatile memory device, the storage controller comprising:
a host interface circuit configured to receive a first write request from an external host;
at least one hardware accelerator configured to add the first write request to a first fragment, select "n" streams among a plurality of pre-allocated streams having a cosine similarity higher than a threshold with respect to a first fragment when the first fragment is greater than or equal a reference value, apply statistical information of the first fragment and the "n" pre-allocated streams to a machine learning model to detect a first sequential stream associated with the first fragment among the "n" pre-allocated streams, and allocate a stream identifier of the first sequential stream to the first fragment;
a flash translation layer configured to translate a logical block address of the first write request into a physical block address based on the stream identifier allocated to the first sequential stream;
a processor configured to drive the flash translation layer; and
a memory interface circuit configured to provide the nonvolatile memory device with the physical block address, write data of the first write request, and a write command to store the write data in the nonvolatile memory device,
wherein "n" is a natural number of at least two.

13. The storage controller of claim 12, wherein the at least one hardware accelerator comprises:
a stream attribute table configured to manage the statistical information of the pre-allocated streams;
a first hardware accelerator configured to add the first write request to the first fragment; and
a second hardware accelerator configured to perform machine learning based on the stream attribute table and the statistical information of the first fragment to allocate the first sequential stream.

14. The storage controller of claim 13, wherein the second hardware accelerator selects the "n" streams of the pre-allocated streams based on the cosine similarity between the first fragment and each of the pre-allocated streams and performs machine learning on statistical information of the selected "n" streams and the statistical information of the first fragment to detect the first sequential stream, where "n" is a natural number of at least two.

15. The storage controller of claim 13, wherein the stream attribute table includes a starting logical block address, an end logical block address, a starting time, an end time, a throughput, and a size vector of data included in each of the pre-allocated streams.

16. The storage controller of claim 13, wherein, after the first sequential stream is detected, the second hardware accelerator is further configured to update the stream attribute table based on the statistical information of the first fragment and the first sequential stream.

17. A storage device comprising:
a plurality of nonvolatile memories; and
a storage controller configured to communicate with the plurality of nonvolatile memories through a plurality of channels,
wherein the storage controller is configured to:
receive a plurality of write requests from an external host;
add a first fragment to one of the write requests;
select "n" streams among a plurality of pre-allocated streams having a cosine similarity higher than a threshold with respect to the first fragment when a size of the first fragment is greater than or equal a reference value;

perform machine learning on statistical information of the received plurality of write requests and statistical information of the "n" pre-allocated streams;

detect a first sequential stream associated with the received plurality of write requests from among the "n" pre-allocated streams based on a result of the machine learning;

allocate a stream identifier of the first sequential stream to the received plurality of write requests; and store a plurality of write data corresponding to the plurality of write requests in one of the plurality of nonvolatile memories, based on the allocated first sequential stream, wherein "n" is a natural number of at least two.

18. The storage device of claim 17, wherein the storage controller receives the plurality of write requests discontinuously from the external host.

19. The storage device of claim 17, wherein logical block addresses respectively corresponding to the plurality of write requests are continuous.

20. The storage device of claim 17, wherein the plurality of write data respectively corresponding to the plurality of write requests are different in size.

* * * * *